(12) United States Patent
Deshpande

(10) Patent No.: US 11,317,141 B2
(45) Date of Patent: *Apr. 26, 2022

(54) RECOVERY DATA WITH CONTENT IDENTIFIERS

(71) Applicant: Sharp Kabushiki Kaisha, Sakai (JP)

(72) Inventor: Sachin G. Deshpande, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,780

(22) Filed: Jun. 23, 2020

(65) Prior Publication Data

US 2021/0014557 A1    Jan. 14, 2021

Related U.S. Application Data

(63) Continuation of application No. 15/780,667, filed as application No. PCT/JP2016/085448 on Nov. 29, 2016, now Pat. No. 10,735,802.

(60) Provisional application No. 62/373,696, filed on Aug. 11, 2016, provisional application No. 62/310,636, filed on Mar. 18, 2016, provisional application No.
(Continued)

(51) Int. Cl.
*H04N 7/173* (2011.01)
*H04N 21/435* (2011.01)
*H04N 21/81* (2011.01)
*H04N 21/8358* (2011.01)
*H04N 21/858* (2011.01)
(Continued)

(52) U.S. Cl.
CPC ......... *H04N 21/435* (2013.01); *H04N 21/235* (2013.01); *H04N 21/4722* (2013.01); *H04N 21/812* (2013.01); *H04N 21/8358* (2013.01); *H04N 21/8586* (2013.01)

(58) Field of Classification Search
CPC .............. H04N 21/435; H04N 21/235; H04N 21/8586; H04N 21/4622; H04N 21/4782; H04N 21/4722; H04N 21/81; H04N 21/8358; H04N 21/858; H04N 21/812
See application file for complete search history.

(56) References Cited

U.S. PATENT DOCUMENTS

| | | | | |
|---|---|---|---|---|
| 2003/0018808 A1* | 1/2003 | Brouk | ................... | H04L 51/046 709/238 |
| 2009/0288116 A1* | 11/2009 | Zalewski | ............. | H04H 20/106 725/38 |

(Continued)

OTHER PUBLICATIONS

Deshpande, "Recovery Data With Content Identifiers", U.S. Appl. No. 15/780,667, filed Jun. 1, 2018.

*Primary Examiner* — Annan Q Shang
(74) *Attorney, Agent, or Firm* — Keating & Bennett, LLP

(57) ABSTRACT

A method and a receiver for receiving a recovery file format file from a provider comprising the steps of: (a) receiving a recovery data table including a RecoveryDataTable element; (b) receiving a contentID field of said RecoveryDataTable element describing a type of content identifier provided in a message having a cardinality of 0 . . . N; (c) receiving a svcInetUrl field of said RecoveryDataTable element describing service information; (d) receiving a URL-Value field of said svcInetUrl field describing URL to access Internet signaling files for said service information; (e) decoding elements of said file based upon said recovery data table.

1 Claim, 59 Drawing Sheets

Related U.S. Application Data

62/302,151, filed on Mar. 1, 2016, provisional application No. 62/263,520, filed on Dec. 4, 2015.

(51) Int. Cl.
  *H04N 21/4722* (2011.01)
  *H04N 21/235* (2011.01)

(56) References Cited

U.S. PATENT DOCUMENTS

| | | | |
|---|---|---|---|
| 2010/0162307 A1* | 6/2010 | Suh | H04H 60/73 725/39 |
| 2013/0055313 A1* | 2/2013 | Eyer | H04N 21/6125 725/49 |
| 2014/0250479 A1* | 9/2014 | Lee | H04N 21/8358 725/110 |
| 2015/0221316 A1* | 8/2015 | Mufti | H04N 21/4316 700/94 |
| 2015/0261753 A1* | 9/2015 | Winograd | G06F 16/9566 707/736 |
| 2015/0286688 A1* | 10/2015 | Xue | G06F 16/2322 707/769 |
| 2016/0134908 A1* | 5/2016 | Kwon | H04N 21/64322 725/109 |
| 2016/0182973 A1* | 6/2016 | Winograd | H04N 21/4722 725/25 |
| 2016/0227260 A1* | 8/2016 | Hundemer | H04N 21/2221 |
| 2016/0381425 A1* | 12/2016 | Yang | H04N 21/4345 725/93 |
| 2017/0201775 A1* | 7/2017 | Oh | H04N 21/2362 |
| 2017/0373776 A1* | 12/2017 | Lee | H04H 60/07 |
| 2018/0020244 A1* | 1/2018 | Oh | H04L 61/2007 |
| 2018/0035153 A1* | 2/2018 | Yang | H04N 21/4104 |

\* cited by examiner

| Y | P P P P P P P P P P P P P P | T T T T T T T T T T T T T T T T T T T T T T T T T | D | L L L L L L L L L |
|---|---|---|---|---|

| | | | | | | | | |
|---|---|---|---|---|---|---|---|---|
| $b_7$ | $b_6$ | $b_5$ | $b_4$ | $b_3$ | $b_2$ | $b_1$ | $b_0$ | |
| 0 | 0 | 0 | 1 | 1 | 0 | 0 | 0 | |
| 1 | 0 | 1 | 1 | 0 | 0 | 0 | 1 | |
| $r_1$ | $r_2$ | $r_3$ | $r_4$ | $r_5$ | $b_t$ | $r_1$ | $r_1$ | |
| $cid_8$ | $cid_7$ | $cid_6$ | $cid_5$ | $cid_4$ | $cid_3$ | $cid_2$ | $cid_1$ | sdo_payload () |

← variable length

FIG.14

| cmdID value | Meaning |
|---|---|
| 0x05 | Watermark based interactive services trigger (TDO model) |
| 0x06 | Watermark based interactive services trigger (Direct execution model) |
| 0x07 | Watermark based location of profile, demographics, interest (PDI) table |
| 0x08 | Watermark based location of audience data server |
| 0x09 | Watermark based base URL for Internet delivery of signaling and announcements |

FIG. 15

```
{
    "$schema": "http://json-schema.org/draft-04/schema#",
    "id": "http://atsc.org/version/3.0/vm/recoveryfileformat#",
    "title": "Recovery file format schema",
    "description": "Return messages from server use this schema.",
    "type": "object",
    "properties": {
        "TimeAnchor": {"type": "string", "format": "date-time"},
        "IntervalCodeAnchor": {"type": "integer", "minimum": 0, "maximum": 33554431},
        "ServiceId": {"type": "string"},
        "QuerySpread": {"type": "number"},
        "ChannelId": { "type": "object",
            "properties": {
                "BsID": { "type": "integer","minimum": 0, "maximum": 65535 },
                "MajorChannelNum":{"type": "integer","minimum": 0, "maximum": 1000 },
                "MinorChannelNum":{"type": "integer","minimum": 0, "maximum": 1000 }
            },
            "required": ["BsID","MajorChannelNum","MinorChannelNum"]
        },
        "Event": {
        "type": "object",
        "properties": {
        "EventID": {"type": "integer"},
        "EventTime": {"type": "string", "format": "date-time"},
        "EventKind": { "type": "object",
        "oneOf": [{"$ref": "#/EType/Trigger"},{"$ref": "#/EType/ContentID"},{"$ref": "#/EType/Query"}],
        "EType": {
            "Trigger": {
                "type": "object",
                "properties": {
                    "Trigger": {"type": "string", "format": "uri"},
                    "Version": {"type": "integer"},
                    "UriType": {"type": "string",
                        "oneOf": [ {"enum": ["AIT", "MPD","ESG"]},
                            {"pattern": "^EXT"}
                        ]},
                    "required": ["Trigger","UriType"]
                }
            },
            "ContentID": {
            "type": "object",
                "properties": {
                    "oneOf": [{"Type": {"type": "string", "enum": ["EIDR"]},
                        "CID": {"type": "string", "pattern": "^10\\.5240/\\[0-9a-fA-F]{4}-){5}[0-9A-Z]$", "minLength": 34, "maxLength": 34}},
                        {"Type": {"type": "string", "enum": ["AD-ID"]},
                        "CID": {"type": "string", "pattern": "^[1-9a-zA-Z]{3}[0-9a-zA-Z]{10}([SIDR])", "minLength": 11, "maxLength": 12}}
                    ]
                }
            },
            "ContentIDSimple": {
                "type": "object",
                "properties": {
                    "Type": {"type": "string", "enum": ["EIDR", "AD-ID"]},
                    "CID": {"type": "string", "minLength": 11, "maxLength": 34}
                }
            },
            "Query": {
                "type": "object",
                "properties": {
                    "Spread": {"type": "number"}
                },
                "required": ["Spread"]
            }
        }
        },
        "required": ["EventID","EventTime"],
        "additionalProperties": false
        },
        "required": ["TimeAnchor","IntervalCodeAnchor","Event"],
        "additionalProperties": false
    }
}
```

```
{
"$schema": "http://json-schema.org/draft-04/schema#",
"id": "http://atsc.org/version/3.0/wm/recoveryfileformat#",
"title": "Recovery file format schema",
"description": "Return messages from server use this schema.",
"RecoveryFF": {
"type": "object",
"properties": {
"TimeAnchor": {"type": "string", "format": "date-time"},
"IntervalCodeAnchor": {"type": "integer", "minimum": 0, "maximum": 33554431},
"ServiceId": {"type": "string"},
"QuerySpread": {"type": "number"},
"ChannelId": { "type": "object",
        "properties": {
          "BsID": { "type": "integer","minimum": 0, "maximum": 65535 },
          "MajorChannelNum":{"type": "integer","minimum": 0, "maximum": 1000 },
          "MinorChannelNum":{"type": "integer","minimum": 0, "maximum": 1000 }
        },
        "required": ["BsID","MajorChannelNum","MinorChannelNum"]
},
"Event": {
"type": "object",
"properties": {
"EventID": {"type": "integer"},
"EventTime": {"type": "string", "format": "date-time"},
"EventKind": { "type": "object",
"oneOf": [{"$ref": "#/EType/Trigger"},{"$ref": "#/EType/ContentID"},{"$ref": "#/EType/Query"}],
"EType": {
   "Trigger": {
      "type": "object",
      "properties": {
         "Trigger": {"type": "string", "format": "uri"},
         "TriggerVersion": {"type": "integer"},
         "UriType": {"type": "string",
              "oneOf": [ {"enum": ["AIT", "MPD","ESG"]},
                    {"pattern": "^EXT"}
              ]},
         "required": ["Trigger","UriType"]
      }
   },
   "ContentID": {
   "type": "object",
      "properties": {
         "oneOf": [{"Type": {"type": "string", "enum": ["EIDR"]},
               "CID": {"type": "string", "pattern": "^10\.5240/([0-9a-fA-F]{4}-){5}[0-9A-Z]$", "minLength": 34, "maxLength": 34}},
               {"Type": {"type": "string", "enum": ["AD-ID"]},
               "CID": {"type": "string", "pattern": "^[1-9a-zA-Z]{1}[0-9a-zA-Z]{10}(H|D)?$", "minLength": 11, "maxLength": 12}}
         ]
      }
   },
   "Query": {
   "type": "object",
      "properties": {
         "Spread": {"type": "number"}
      },
      "required": ["Spread"]
   }
  }
 }
},
"required": ["EventID","EventTime"],
"additionalProperties": false
},
"required": ["TimeAnchor","IntervalCodeAnchor","Event"],
"additionalProperties": true
}
 }
}
```

```
{
    "$schema": "http://json-schema.org/draft-04/schema#",
    "id": "http://atsc.org/version/3.0/wm/recoveryfileformat#",
    "title": "Recovery file format schema",
    "description": "Return messages from server use this schema.",
    "@context":
    {
            "RecoveryFF": "http://www.atsc.org/contexts/3.0/RecoveryFF"
    },
    "RecoveryFF": {
        "type": "object",
        "properties": {
        "TimeAnchor": {"type": "string", "format": "date-time"},
        "IntervalCodeAnchor": {"type": "integer", "minimum": 0, "maximum": 3865443},
        "ServiceId": {"type": "string"},
        "QuerySpread": {"type": "number"},
        "ChannelId": { "type": "object",
                "properties": {
                    "BsID": { "type": "integer","minimum": 0, "maximum": 65535 },
                    "MajorChannelNum":{"type": "integer","minimum": 0, "maximum": 1000 },
                    "MinorChannelNum":{"type": "integer","minimum": 0, "maximum": 1000 }
                },
                "required": ["BsID","MajorChannelNum","MinorChannelNum"]
        },
        "Event": {
        "type": "object",
        "properties" : {
        "EventID": {"type": "integer"},
        "EventTime": {"type": "string", "format": "date-time"},
        "EventKind": {"type": "object",
        "oneOf": [{"$ref": "#/EType/Trigger"},{"$ref": "#/EType/ContentID"},{"$ref": "#/EType/Query"}]},
        "EType": {
            "Trigger": {
                "type": "object",
                "properties": {
                    "Trigger": {"type": "string", "format": "uri"},
                    "TriggerVersion": {"type": "integer"},
                    "UriType": {"type": "string",
                        "oneOf": [ {"enum": ["AIT", "MPD","ESG"]},
                            {"pattern": "^EXT"}
                        ]
                    },
                    "required": ["Trigger","UriType"]
                }
            },
            "ContentID": {
                "type": "object",
                "properties": {
                    "oneOf": [ {"Type": {"type": "string", "enum": ["EIDR"]},
                        "CID": {"type": "string", "pattern": "^10\.5240/([0-9a-fA-F]{4}-){5}[0-9A-Z]$", "minLength": 34, "maxLength": 34}},
                        {"Type": {"type": "string", "enum": ["AD-ID"]},
                        "CID": {"type": "string", "pattern": "^[0-9a-zA-Z]{1}[0-9a-zA-Z]{10}[H|C]?$", "minLength": 11, "maxLength": 12}}
                    ]
                }
            },
            "Query": {
                "type": "object",
                "properties": {
                    "Spread": {"type": "number"}
                },
                "required": ["Spread"]
            }
        }
        },
        "required": ["EventID","EventTime"],
        "additionalProperties": false
    },
    "required": ["TimeAnchor","IntervalCodeAnchor","Event"],
    "additionalProperties": true
    }
}
```

FIG.20

```
{
    "$schema": "http://json-schema.org/draft-04/schema#",
    "id": "http://atsc.org/version/3.0/xml/recoveryfileformat#",
    "title": "Recovery file format schema",
    "description": "Return messages from server use this schema.",
    "@context":
    {
        "RecoveryFF": "http://www.atsc.org/contexts/3.0/RecoveryFF"
        "RecoveryFF2": "http://www.atsc.org/contexts/0.1/RecoveryFF"
    },
    "RecoveryFF": {
    "type": "object",
    "properties": {
    "TimeAnchor": {"type": "string", "format": "date-time"},
    "IntervalCodeAnchor": {"type": "integer", "minimum": 0, "maximum": 33554431},
    "ServiceId": {"type": "string"},
    "QuerySpread": {"type": "number"},
    "ChannelId": { "type": "object",
              "properties": {
                  "BsID": ( "type": "integer","minimum": 0, "maximum": 65535 ),
                  "MajorChannelNum":{"type": "integer","minimum": 0, "maximum": 1000 },
                  "MinorChannelNum":{"type": "integer","minimum": 0, "maximum": 1000 }
              },
              "required": ["BsID","MajorChannelNum","MinorChannelNum"]
             },
    "Event": {
    "type": "object",
    "properties": {
    "EventID": { "type": "integer"},
    "EventTime":{"type": "string", "format": "date-time"},
    "EventKind": { "type": "object",
    "oneOf": [{"$ref": "#/EType/Trigger"},{"$ref": "#/EType/ContentID"},{"$ref": "#/EType/Query"}],
    "EType": {
       "Trigger": {
          "type": "object",
          "properties": {
              "Trigger": {"type": "string", "format": "uri"},
              "TriggerVersion": {"type": "integer"},
              "UriType": {"type": "string",
                  "oneOf": [ { "enum": ["MPT", "MPD","ESG"]},
                             {"pattern": "^EXT"}
                  ]
              },
              "required": ["Trigger","UriType"]
          }
       },
       "ContentID": {
          "type": "object",
          "properties": {
              "oneOf": [ {"Type": {"type": "string", "enum": ["EIDR"]},
              "CID": {"type": "string", "pattern": "^10\.&240/[0-9a-fA-F]{4}-[5][0-9A-Z]$", "minLength": 34, "maxLength": 34}},
              {"Type": {"type": "string", "enum": ["AD-ID"]},
              "CID": {"type": "string", "pattern": "^[0-9a-zA-Z]{1}[0-9a-zA-Z]{10}([HG]?)$", "minLength": 11, "maxLength": 12}}
              ]
          }
       },
       "Query": {
           "type": "object",
           "properties": {
               "Spread": {"type": "number"}
           },
           "required": ["Spread"]
       }
    }
  },
  "required": ["EventID","EventTime"],
  "additionalProperties": false
 },
 "required": ["TimeAnchor","IntervalCodeAnchor","Event","newKey8"],
 "additionalProperties": true
 },
 "RecoveryFF2": {
 "type": "object",
 "properties": {
     "newKeyA": "valueA",
     "newKeyB": "valueB"
  },
  "required": ["newKeyA"], "additionalProperties": true
 }
}
```

FIG.21

```
"$schema": "http://json-schema.org/draft-04/schema#",
"id": "http://atsc.org/version/3.0/wm/recoveryfileformat#",
"title": "Recovery file format schema",
"description": "Return messages from server use this schema.",
"@context":
{
        "RecoveryFF": "http://www.atsc.org/contexts/3.1/RecoveryFFV1"
},
"RecoveryFF": {
"type": "object",
"properties": {
"TimeAnchor": {"type": "string", "format": "date-time"},
"IntervalCodeAnchor": {"type": "integer", "minimum": 0, "maximum": 33954431},
"ServiceId": {"type": "string"},
"QuerySpread": {"type": "number"},
"ChannelId": {"type": "object"
        "properties": {
           "BsID": {"type": "integer","minimum": 0, "maximum": 65535 },
           "MajorChannelNum":{"type": "integer","minimum": 0, "maximum": 1000 },
           "MinorChannelNum":{"type": "integer","minimum": 0, "maximum": 1000 }
         },
         "required": ["BsID","MajorChannelNum","MinorChannelNum"]
         },
"Event": {
"type": "object",
"properties": {
"EventID": {"type": "integer"},
"EventTime": {"type": "string", "format": "date-time"},
"EventKind": {"type": "object",
"oneOf": [{"$ref": "#/EType/Trigger"},{"$ref": "#/EType/ContentID"},{"$ref": "#/EType/Query"}],
"EType": {
   "Trigger": {
      "type": "object",
      "properties": {
         "Trigger": {"type": "string", "format": "uri"},
         "TriggerVersion": {"type": "integer"},
         "UriType" {"type": "string",
             "oneOf": [ {"enum": ["AIT","MPD","ESG"]},
                  {"pattern": "^EXT"}
             ]},
         "required": ["Trigger","UriType"]
      }
   },
"ContentID": {
   "type": "object",
   "properties": {
      "oneOf": [ {"Type": {"type": "string", "enum": ["EIDR"]},
           "CID": {"type": "string", "pattern": "^10\.5240/([0-9a-fA-F]{4}-){5}[0-9A-Z]$", "minLength": 34, "maxLength": 34}}
           {"Type": {"type": "string", "enum": ["AD-ID"]},
           "CID": {"type": "string", "pattern": "^[1-9a-zA-Z]{1}[0-9a-zA-Z]{10}(H|D)?$", "minLength": 11, "maxLength": 13}}
      ]
   }
},
"Query": {
"type": "object",
"properties": {
       "Spread": {"type": "number"}
  },
  "required": ["Spread"]
  }
      }
    }
  },
  "required": ["EventID","EventTime"],
  "additionalProperties": false
},
"newkeyA": "valueA",
"newkeyB": "valueB",
"required": ["TimeAnchor","IntervalCodeAnchor","Event","newKeyB"],
"additionalProperties": true
}
}
}
```

| Element or Attribute Name | Use | Data Type | Format |
|---|---|---|---|
| RecoveryDataTable | 1 | | Root element |
| ThisComponent | 1 | | The media component from which the payload carrying serverCode and intervalCode was detected. |
|   serverCode | 0..1 | integer | The serverCode value from the query request to which the recovery data table was provided as a response. |
|   intervalCode | 0..1 | integer | The intervalCode value from the query request to which the recovery data table was provided as a response. |
|   ComponentDescription | 1 | object | The description of this component, as defined in Table 2. |
| querySpread | 0..1 | integer | Time in seconds over which device should randomly choose time for querying dynamic event Server. |
| otherComponent | 0..N | object | The audio or video components other than this component, which carries coincident watermark payloads. |
| ContentID | 0..N | | Content identifier |
|   Type | 1 | string | Defined values: "EIDR", "Ad-ID" |
|   cid | 1 | string | Either an EIDR (34-character canonical form with hyphens) or Ad-ID (11 or 12-character canonical form) string. |
|   validFrom | 1 | string (date-time) | When ContentID is valid from |
|   validUntil | 0..1 | string (date-time) | Up to when ContentID is valid until |
| SourceID | 0..1 | | |
|   country | 1 | string | ISO 3166-1 alpha-2 country code associated with the primary administrative entity under which the given bsid is assigned. |
|   bsid | 1 | integer | Identifier of the whole Broadcast Stream. The value of BSID shall be unique on a regional level (for example, North America). An administrative or regulatory authority may play a role. |
|   majorChannelNo | 1 | integer | An integer number in the range 1 to 1000 representing the "major" channel number of the service. |
|   minorChannelNo | 1 | integer | An integer number in the range 1 to 1000 representing the "minor" channel number of the service. |
| Service | 1 | | |
|   serviceId | 1 | integer | Number that shall uniquely identify this service within the scope of bsid. |
|   sltSvcSeqNum | 1 | integer | Version of service information in this table – increments by one for each new version of service data in RDT; wraps around to 0. |
|   slsProtocol | 0..1 | integer | Protocol used to deliver the service layer signaling for this service |
|   slsMajorProtocolVersion | 0..1 | integer | Major version number of the protocol used to deliver the service layer signaling for this service. |
|   slsMinorProtocolVersion | 0..1 | integer | Minor version number of the protocol used to deliver the service layer signaling for this service. |
|   svcInetUrl | 0..N | | |
|     URLtype | 1 | integer | Type of files available with this URL |
|     URLValue | 1 | string (uri) | URL to access Internet signaling files for this service. |

FIG. 22

| Element or Attribute Name | Use | Data Type | Format |
|---|---|---|---|
| ComponentDescription | | | |
| ComponentAnchor | 1 | | The mapping between the first payload in this watermark segment and its presentation time as defined for ComponentAnchor element. |
| mediaType | 1 | String (enumerated) | The media type of this component. Three values are defined: "audio" indicates an audio component, "video" indicates a video component, and "both" indicates that serverCode and intervalCode are present in both audio and video content. |
| Descriptor | 0..1 | string | Information associated with the component intended for consumption by an application. |
| Priority | 0..1 | integer | The relative priority of the component that carries serverCode and intervalCode. Recovery data indicated in components with larger priority values shall take precedence over that of components with lower priority values. When no priority is indicated, the default priority of a component is 0. |

FIG. 23

| Element or Attribute Name | Use | Data Type | Format |
|---|---|---|---|
| ComponentAnchor | 1 | | |
| intervalCodeAnchor | 1 | Integer | The interval code to be used as anchor for presentation time. |
| presentationTime | | string | Presentation time corresponding to intervalCodeAnchor, in 64-bit NTP format |

FIG. 24A

| Element or Attribute Name | Use | Data Type | Format |
|---|---|---|---|
| ComponentAnchor | 1 | | |
| intervalCodeAnchor | 1 | integer | The interval code to be used as anchor for presentation time. |
| presentationTimeInteger | 1 | integer | Integer part (First 32 bits) of 64-bit NTP formatted presentation time corresponding to intervalCodeAnchor |
| presentationTimeFraction | 1 | integer | Fraction part (last 32 bits) of 64-bit NTP formatted presentation time corresponding to intervalCodeAnchor. In this 32-bit fraction part non-significant low-order bits shall be set to 0. |

FIG. 24B

| Element or Attribute Name | Use | Data Type | Format |
|---|---|---|---|
| ComponentAnchor | 1 | | |
| intervalCodeAnchor | 1 | integer | The interval code to be used as anchor for presentation time. |
| presentationTime | 1 | integer | Least-significant 32 bits of the count of the number of seconds of the presentation time. |
| presentationTimeMsec | 1 | integer | 10 bits unsiged integer in the range of 0 to 999 indicting milliseconds offset relate to presentation time. |

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "ThisComponent": {
        "type": "object",
        "properties": {
          "serverCode": {"type": "integer"},
          "intervalCode": {"type": "integer"},
          "ComponentDescription": {
            "type": "object",
            "properties": {
              "ComponentAnchor": {
                "type": "object",
                "properties": {
                  "intervalCodeAnchor": {
                    "type": "integer",
                    "minimum": 0,
                    "maximum": 33554431
                  },
                  "presentationTime": {"type": "string"}
                },
                "required": [
                  "intervalCodeAnchor",
                  "presentationTime"
                ]
              },
              "mediaType": {
                "type": "string",
                "enum": [
                  "audio",
                  "video",
                  "both"
                ]
              },
              "Descriptor": {
                "type": "string",
                "format": "uri"
              },
              "priority": {
                "type": "integer",
                "minimum": 0,
                "maximum": 255
              }
            },
            "required": [
              "ComponentAnchor",
```

Fig. 25B

```
                    "mediaType"
                ]
            }
        },
        "required": ["ComponentDescription"]
    },
    "QuerySpread": {"type": "integer"},
    "OtherComponent": {
        "type": "object",
        "properties": {
            "ComponentAnchor": {
                "type": "object",
                "properties": {
                    "intervalCodeAnchor": {
                        "type": "integer",
                        "minimum": 0,
                        "maximum": 33554431
                    },
                    "presentationTime": {"type": "string"}
                },
                "required": [
                    "intervalCodeAnchor",
                    "presentationTime"
                ]
            },
            "mediaType": {
                "type": "string",
                "enum": [
                    "audio",
                    "video",
                    "both"
                ]
            },
            "Descriptor": {
                "type": "string",
                "format": "url"
            },
            "priority": {
                "type": "integer",
                "minimum": 0,
                "maximum": 256
            }
        },
        "required": [
            "ComponentAnchor",
            "mediaType"
        ]
    }
},
"ContentID": {
    "type": "array",
    "items": {
        "type": "object",
        "properties": {"oneOf": [
            {
                "Type": {
```

Fig. 25C

```
            "type": "string",
            "enum": ["EIDR"]
          },
          "cid": {
            "type": "string",
            "pattern": "^10\\.5240\\/([0-9a-fA-F]{4}-){5}[0-9A-Z]$",
            "minLength": 34,
            "maxLength": 34
          },
          "validFrom": {
            "type": "string",
            "format": "date-time"
          },
          "validUntil": {
            "type": "string",
            "format": "date-time"
          }
        },
        {
          "Type": {
            "type": "string",
            "enum": ["AD-ID"]
          },
          "cid": {
            "type": "string",
            "pattern": "^[1-9a-zA-Z]{1}[0-9a-zA-Z]{10}(H|D)?$",
            "minLength": 11,
            "maxLength": 12
          },
          "validFrom": {
            "type": "string",
            "format": "date-time"
          },
          "validUntil": {
            "type": "string",
            "format": "date-time"
          }
        }
      ]
    },
    "minItems": 0
  },
  "Service": {
    "type": "object",
    "properties": {
      "serviceId": {
        "type": "integer",
        "minimum": 0,
        "maximum": 65535
      },
      "sltSvcSeqNum": {
        "type": "integer",
        "minimum": 0,
        "maximum": 255
      },
      "slsProtocol": {
```

Fig. 25D

```
            "type": "integer",
            "minimum": 0,
            "maximum": 255
        },
        "slsMajorProtocolVersion": {
            "type": "integer",
            "minimum": 0,
            "maximum": 255
        },
        "slsMinorProtocolVersion": {
            "type": "integer",
            "minimum": 0,
            "maximum": 255
        },
        "svcInetUrl": {
          "type": "array",
          "items": {
            "type": "object",
            "properties": {
                "URLType": {
                    "type": "integer",
                    "minimum": 0,
                    "maximum": 255
                },
                "URLValue": {
                    "type": "string",
                    "format": "uri"
                }
            },
            "required": [
                "URLType",
                "URLValue"
            ]
          }
        }
      },
      "required": [
        "serviceId",
        "sltSvcSeqNum"
      ]
    }
  },
  "required": ["ThisComponent","Service"],
  "additionalProperties": true
  },
  "required": ["RecoveryDataTable"]
}
```

Fig. 26A

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "ThisComponent": {
        "type": "object",
        "properties": {
          "serverCode": {"type": "integer"},
          "intervalCode": {"type": "integer"},
          "ComponentDescription": {
            "type": "object",
            "properties": {
              "ComponentAnchor": {
                "type": "object",
                "properties": {
                  "intervalCodeAnchor": {
                    "type": "integer",
                    "minimum": 0,
                    "maximum": 33554431
                  },
                  "presentationTimeInteger": {"type": "integer", "minimum": 0, "maximum": 4294967295},
                  "presentationTimeFraction": {"type": "integer", "minimum": 0, "maximum": 4294967295}
                },
                "required": [
                  "intervalCodeAnchor",
                  "presentationTimeInteger",
                  "presentationTimeFraction"
                ]
              },
              "mediaType": {
                "type": "string",
                "enum": [
                  "audio",
                  "video",
                  "both"
                ]
              },
              "Descriptor": {
                "type": "string",
                "format": "uri"
              },
              "priority": {
                "type": "integer",
                "minimum": 0,
                "maximum": 255
              }
            },
            "required": [
              "ComponentAnchor",
              "mediaType"
            ]
          }
        }
      },
      "required": ["ComponentDescription"]
```

Fig. 26B

```
},
"QuerySpread": {"type": "integer"},
"OtherComponent": {
  "type": "object",
  "properties": {
    "ComponentAnchor": {
      "type": "object",
      "properties": {
        "intervalCodeAnchor": {
          "type": "integer",
          "minimum": 0,
          "maximum": 33654431
        },
        "presentationTimeInteger": {"type": "integer", "minimum": 0, "maximum": 4294967295},
        "presentationTimeFraction": {"type": "integer", "minimum": 0, "maximum": 4294967295}
      },
      "required": [
        "intervalCodeAnchor",
        "presentationTimeInteger",
        "presentationTimeFraction"
      ]
    },
    "mediaType": {
      "type": "string",
      "enum": [
        "audio",
        "video",
        "both"
      ]
    },
    "Descriptor": {
      "type": "string",
      "format": "url"
    },
    "priority": {
      "type": "integer",
      "minimum": 0,
      "maximum": 255
    }
  },
  "required": [
    "ComponentAnchor",
    "mediaType"
  ]
 }
},
"ContentID": {
  "type": "array",
  "items": {
    "type": "object",
    "properties": {"oneOf": [
      {
        "Type": {
          "type": "string",
          "enum": ["EIDR"]
        },
        "cid": {
          "type": "string",
          "pattern": "^10\\.5240\\/([0-9a-fA-F]{4}-){5}[0-9A-Z]$",
          "minLength": 34,
          "maxLength": 34
        },
```

Fig. 26C

```
            "validFrom": {
                "type": "string",
                "format": "date-time"
            },
            "validUntil": {
                "type": "string",
                "format": "date-time"
            }
        },
        {
            "Type": {
                "type": "string",
                "enum": ["AD-ID"]
            },
            "cid": {
                "type": "string",
                "pattern": "^[1-9a-zA-Z]{1}[0-9a-zA-Z]{10}(H|D)?$",
                "minLength": 11,
                "maxLength": 12
            },
            "validFrom": {
                "type": "string",
                "format": "date-time"
            },
            "validUntil": {
                "type": "string",
                "format": "date-time"
            }
        }
    ],
    "minItems": 0
},
"Service": {
    "type": "object",
    "properties": {
        "serviceId": {
            "type": "integer",
            "minimum": 0,
            "maximum": 65535
        },
        "sltSvcSeqNum": {
            "type": "integer",
            "minimum": 0,
            "maximum": 255
        },
        "slsProtocol": {
            "type": "integer",
            "minimum": 0,
            "maximum": 255
        },
        "slsMajorProtocolVersion": {
            "type": "integer",
            "minimum": 0,
            "maximum": 255
        },
        "slsMinorProtocolVersion": {
            "type": "integer",
            "minimum": 0,
            "maximum": 255
        },
        "svcInetUrl": {
```

Fig. 26D

```
            "type": "array",
            "items": {
              "type": "object",
              "properties": {
                "URLType": {
                  "type": "Integer",
                  "minimum": 0,
                  "maximum": 255
                },
                "URLValue": {
                  "type": "string",
                  "format": "uri"
                }
              },
              "required": [
                "URLType",
                "URLValue"
              ]
            }
          },
          "required": [
            "serviceId",
            "sltSvcSeqNum"
          ]
        }
      },
      "required": ["ThisComponent","Service"],
      "additionalProperties": true
    },
    "required": ["RecoveryDataTable"]
}
```

Fig. 27A

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "ThisComponent": {
        "type": "object",
        "properties": {
          "serverCode": {"type": "integer"},
          "intervalCode": {"type": "integer"},
          "ComponentDescription": {
            "type": "object",
            "properties": {
              "ComponentAnchor": {
                "type": "object",
                "properties": {
                  "intervalCodeAnchor": {
                    "type": "integer",
                    "minimum": 0,
                    "maximum": 33554431
                  },
                  "presentationTime": {"type": "integer", "minimum": 0, "maximum": 4294967295},
                  "presentationTimeMsec": {"type": "integer", "minimum": 0, "maximum": 999}
                },
                "required": [
                  "intervalCodeAnchor",
                  "presentationTime",
                  "presentationTimeMSec"
                ]
              },
              "mediaType": {
                "type": "string",
                "enum": [
                  "audio",
                  "video",
                  "both"
                ]
              },
              "Descriptor": {
                "type": "string",
                "format": "uri"
              },
              "priority": {
                "type": "integer",
                "minimum": 0,
                "maximum": 255
              }
            },
            "required": [
              "ComponentAnchor",
              "mediaType"
            ]
          }
        },
        "required": ["ComponentDescription"]
      },
      "QuerySpread": {"type": "integer"},
      "OtherComponent": {
```

Fig. 27B

```
"type": "object",
"properties": {
    "ComponentAnchor": {
        "type": "object",
        "properties": {
            "intervalCodeAnchor": {
                "type": "integer",
                "minimum": 0,
                "maximum": 33554431
            },
            "presentationTime": {"type": "integer", "minimum": 0, "maximum": 4294967295},
            "presentationTimeMsec": {"type": "integer", "minimum": 0, "maximum": 999}
        },
        "required": [
            "intervalCodeAnchor",
            "presentationTime",
            "presentationTimeMSec"
        ]
    },
    "mediaType": {
        "type": "string",
        "enum": [
            "audio",
            "video",
            "both"
        ]
    },
    "Descriptor": {
        "type": "string",
        "format": "uri"
    },
    "priority": {
        "type": "integer",
        "minimum": 0,
        "maximum": 255
    }
},
"required": [
    "ComponentAnchor",
    "mediaType"
]
}
},
"ContentID": {
    "type": "array",
    "items": {
        "type": "object",
        "properties": {"oneOf": [
            {
                "Type": {
                    "type": "string",
                    "enum": ["EIDR"]
                },
                "cid": {
                    "type": "string",
                    "pattern": "^10\\.5240\\/([0-9a-fA-F]{4}-){5}[0-9A-Z]$",
                    "minLength": 34,
                    "maxLength": 34
                },
                "validFrom": {
                    "type": "string",
                    "format": "date-time"
```

Fig. 27C

```
        },
        "validUntil": {
            "type": "string",
            "format": "date-time"
        }
    },
    {
        "Type": {
            "type": "string",
            "enum": ["AD-ID"]
        },
        "cid": {
            "type": "string",
            "pattern": "^[1-9a-zA-Z]{1}[0-9a-zA-Z]{10}(H|D)?$",
            "minLength": 11,
            "maxLength": 12
        },
        "validFrom": {
            "type": "string",
            "format": "date-time"
        },
        "validUntil": {
            "type": "string",
            "format": "date-time"
        }
    }
    ]
},
"minItems": 0
},
"Service": {
    "type": "object",
    "properties": {
        "serviceId": {
            "type": "integer",
            "minimum": 0,
            "maximum": 65535
        },
        "sltSvcSeqNum": {
            "type": "integer",
            "minimum": 0,
            "maximum": 255
        },
        "slsProtocol": {
            "type": "integer",
            "minimum": 0,
            "maximum": 255
        },
        "slsMajorProtocolVersion": {
            "type": "integer",
            "minimum": 0,
            "maximum": 255
        },
        "slsMinorProtocolVersion": {
            "type": "integer",
            "minimum": 0,
            "maximum": 255
        },
        "svcInetUrl": {
            "type": "array",
            "items": {
                "type": "object",
```

Fig. 27D

```
            "properties": {
              "URLType": {
                "type": "integer",
                "minimum": 0,
                "maximum": 255
              },
              "URLValue": {
                "type": "string",
                "format": "uri"
              }
            },
            "required": [
              "URLType",
              "URLValue"
            ]
          }
        },
        "required": [
          "serviceId",
          "sltSvcSeqNum"
        ]
      }
    },
    "required": ["ThisComponent","Service"],
    "additionalProperties": true
  },
  "required": ["RecoveryDataTable"]
}
```

| Element or Attribute Name | | | Use | Data Type | Format |
|---|---|---|---|---|---|
| RecoveryDataTable | | | 1 | | Root element |
| | thisComponent | | 1 | | The media component from which the VP1 payload carrying serverCode and intervalCode was detected. |
| | | serverCode | 0..1 | integer | The serverCode value from the query request to which the recovery data table was provided as a response. |
| | | intervalCode | 0..1 | integer | The intervalCode value from the query request to which the recovery data table was provided as a response. |
| | | componentDescription | 1 | ComponentDescriptionType | The description of this component, as defined in FIG. 29 |
| | querySpread | | 0..1 | integer | Time in milliseconds over which device should randomly choose time for querying Dynamic Event Server when signaled by the "query_flag" in the VP1 payload. |
| | otherComponent | | 0..N | ComponentDescriptionType | An audio or video component, other than this component, which carries coincident VP1 payloads. (See FIG. 29 for data type.) |
| | contentID | | 0..N | | Content identifier |
| | | type | 1 | string | Type of Content ID system |
| | | cid | 1 | string | Content ID value. |
| | | validFrom | 1 | string (date-time) | When contentID is valid from |
| | | validUntil | 0..1 | string(date-time) | When contentID is valid until. If this field is not present, this contentID is valid until the validFrom of the next contentID. |
| | sourceID | | 0..1 | | |
| | | country | 1 | string | ISO 3166-1 alpha-2 country code associated with the primary administrative entity under which the given bsid is assigned. |
| | | bsid | 1 | integer | Identifier of the whole Broadcast Stream. The value of BSID shall be unique on a regional level (for example, North America). An administrative or regulatory authority may play a role. |
| | | majorChannelNo | 1 | integer | An integer number in the range 1 to 999 representing the "major" channel number of the service. |
| | | minorChannelNo | 1 | integer | An integer number in the range 1 to 999 representing the "minor" channel number of the service. |
| | service | | 1 | | |
| | | serviceId | 1 | integer | Number that shall uniquely identify this service within the scope of bsid. |
| | | sltSvcSeqNum | 1 | integer | Version of service information in this table – increments by one for each new version of service data in RDT; wraps around to 0. |
| | | slsProtocol | 0..1 | integer | Protocol used to deliver the service layer signaling for this service. See FIG. 31 |
| | | slsMajorProtocolVersion | 0..1 | integer | Major version number of the protocol used to deliver the service layer signaling for this service. |
| | | slsMinorProtocolVersion | 0..1 | integer | Minor version number of the protocol used to deliver the service layer signaling for this service. |
| | | svcInetUrl | 0..N | | |
| | | urlType | 1 | unsignedByte | Type of files available with this URL |
| | | urlValue | 1 | string (url) | URL to access Internet signaling files for this service. |

FIG. 28

| Element or Attribute Name | Use | Data Type | Format |
|---|---|---|---|
| componentDescription | | | |
| serverCode | 0..1 | integer | The server code of the component's VP1 watermarks. It is allowed to be present only for the otherComponent element. |
| componentAnchor | 1 | | The mapping between the first VP1 payload in this watermark segment and its presentation time as defined in FIG. 30. |
| mediaType | 1 | string | The media type of this component. Three values are defined: "audio" indicates an audio component, "video" indicates a video component, and "both" indicates that serverCode and intervalCode are present in both audio and video content. |
| descriptor | 0..1 | string | Information associated with the component intended for consumption by an application. |
| priority | 0..1 | integer | The relative priority of the component that carries serverCode and intervalCode. Recovery data indicated in components with larger priority values shall take precedence over that of components with lower priority values. When no priority is indicated, the default priority of a component is 0. |

FIG. 29

| Element or Attribute Name | Use | Data Type | Format |
|---|---|---|---|
| componentAnchor | 1 | | |
| intervalCodeAnchor | 1 | integer | The interval code to be used as anchor for presentation time. |
| presentationTime | 1 | integer | Presentation time in seconds corresponding to intervalCodeAnchor as the least-significant 32 bits of the count of the number of seconds since January 1, 1970 00:00:00, International Atomic Time (TAI). |
| presentationTimeMS | 1 | integer | milliseconds offset from the time indicated in presentationTime |

FIG. 30

| slsProtocol value | Meaning |
|---|---|
| 0 | Reserved |
| 1 | ROUTE/DASH (as defined in ATSC 3.0 Candidate Standard A/331- ATSC: "Signaling, Delivery, Synchronization and Error Correction) |
| 2 | MMTP (as defined in ATSC 3.0 Candidate Standard A/331- ATSC: "Signaling, Delivery, Synchronization and Error Correction) |
| 3-15 | Reserved for future use |

FIG. 31

| uriType Value | Meaning |
|---|---|
| 0x00 | Reserved |
| 0x01 | Signaling server (providing access to the Service Layer Signaling (SLS), as specified in section 7 of ATSC 3.0 Candidate Standard A/331- ATSC: "Signaling, Delivery, Synchronization and Error Correction"). |
| 0x02 | ESG data server (providing access to the ESG data, as specified in ATSC 3.0 Candidate Standard A/332- ATSC: "Service Announcement"). |
| 0x03 | URL of Service Usage Data Gathering Report server (for use in reporting service usage, as specified in ATSC 3.0 Candidate Standard A/333- ATSC: "Service Usage Reporting"). |
| 0x04-0xFF | Reserved |

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "thisComponent": {
        "type": "object",
        "properties": {
          "serverCode": {"type": "Integer"},
          "intervalCode": {"type": "integer"},
          "componentDescription": {
            "type": "object",
            "properties": {
              "componentAnchor": {
                "type": "object",
                "properties": {
                  "intervalCodeAnchor": {
                    "type": "integer",
                    "minimum": 0,
                    "maximum": 33554431
                  },
                  "presentationTime": {"type": "integer", "minimum": 0, "maximum": 4294967295},
                  "presentationTimeMs": {"type": "integer", "minimum": 0, "maximum": 999}
                },
                "required": [
                  "intervalCodeAnchor",
                  "presentationTime",
                  "presentationTimeMs"
                ]
              },
              "mediaType": {
                "type": "string",
                "enum": [
                  "audio",
                  "video",
                  "both"
                ]
              },
              "descriptor": {
                "type": "string"
              },
              "priority": {
                "type": "integer",
                "minimum": 0,
                "maximum": 255
              }
            },
            "required": [
              "componentAnchor",
              "mediaType"
```

Fig. 33B

```
        ]
      }
    },
    "required": ["componentDescription"]
  },
  "querySpread": {"type": "integer"},
  "otherComponent": {
    "type": "object",
    "properties": {
      "serverCode": {"type": "integer"},
      "componentAnchor": {
        "type": "object",
        "properties": {
          "intervalCodeAnchor": {
            "type": "integer",
            "minimum": 0,
            "maximum": 33554431
          },
          "presentationTime": {"type": "integer", "minimum": 0, "maximum": 4294967295},
          "presentationTimeMs": {"type": "integer", "minimum": 0, "maximum": 999}
        },
        "required": [
          "intervalCodeAnchor",
          "presentationTime",
          "presentationTimeMs"
        ]
      },
      "mediaType": {
        "type": "string",
        "enum": [
          "audio",
          "video",
          "both"
        ]
      },
      "Descriptor": {
        "type": "string"
      },
      "priority": {
        "type": "integer",
        "minimum": 0,
        "maximum": 255
      }
    },
    "required": [
      "componentAnchor",
      "mediaType"
    ]
  }
},
"contentID": {
  "type": "array",
  "items": {
    "type": "object",
    "properties": {"oneOf": [
      {
```

Fig. 33C

```
    "type": {
        "type": "string",
        "enum": ["EIDR"]
    },
    "cid": {
        "type": "string",
        "pattern": "^10\\.5240\\/([0-9a-fA-F]{4}-){5}[0-9A-Z]$",
        "minLength": 34,
        "maxLength": 34
    },
    "validFrom": {
        "type": "string",
        "format": "date-time"
    },
    "validUntil": {
        "type": "string",
        "format": "date-time"
    }
},
{
    "type": {
        "type": "string",
        "enum": ["Ad-ID"]
    },
    "cid": {
        "type": "string",
        "pattern": "^[1-9a-zA-Z]{1}[0-9a-zA-Z]{10}(H|D)?$",
        "minLength": 11,
        "maxLength": 12
    },
    "validFrom": {
        "type": "string",
        "format": "date-time"
    },
    "validUntil": {
        "type": "string",
        "format": "date-time"
    }
},
{
    "type": {
        "type": "string",
        "enum": ["UserPriv"]
    },
    "cid": {
        "type": "string"
    },
    "validFrom": {
        "type": "string",
        "format": "date-time"
    },
    "validUntil": {
        "type": "string",
        "format": "date-time"
    }
},
```

Fig. 33D

```
                    {"type": "object"}
                ]}
            },
            "minItems": 0
        },
        "sourceID": { "type": "object",
            "properties": {
                "country": {"type": "string","pattern": "^[a-zA-Z]{2}$"},
                "bsid":  { "type": "integer","minimum": 0, "maximum": 65535 },
                "majorChannelNo":{"type": "integer","minimum": 1, "maximum": 999 },
                "minorChannelNo":{"type": "integer","minimum": 1, "maximum": 999 }
            },
            "required": ["country","bsid","majorChannelNo","minorChannelNo"]
        },
        "service": {
            "type": "object",
            "properties": {
                "serviceId": {
                    "type": "integer",
                    "minimum": 0,
                    "maximum": 65535
                },
                "sltSvcSeqNum": {
                    "type": "integer",
                    "minimum": 0,
                    "maximum": 255
                },
                "slsProtocol": {
                    "type": "integer",
                    "minimum": 0,
                    "maximum": 255
                },
                "slsMajorProtocolVersion": {
                    "type": "integer",
                    "minimum": 0,
                    "maximum": 255
                },
                "slsMinorProtocolVersion": {
                    "type": "integer",
                    "minimum": 0,
                    "maximum": 255
                },
                "svcInetUrl": {
                "type": "array",
                "items": {
                    "type": "object",
                    "properties": {
                        "urlType": {
                            "type": "integer",
                            "minimum": 0,
                            "maximum": 255
                        },
                        "urlValue": {
                            "type": "string",
                            "format": "uri"
                        }
```

Fig. 33E

```
        },
        "required": [
          "urlType",
          "urlValue"
        ]
      }
    },
    "required": [
      "serviceId",
      "sltSvcSeqNum"
    ]
  }
},
"required": ["thisComponent","service"],
"additionalProperties": true
},
"required": ["RecoveryDataTable"]
}
```

Fig. 34A

```
{
  "$schema": "http://json-schema.org/draft-04/schema#",
  "id": "http://atsc.org/version/3.0/wm/recoveryfileformat#",
  "title": "Recovery file format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "thisComponent": {
        "type": "object",
        "properties": {
          "serverCode": {"type": "integer"},
          "intervalCode": {"type": "integer"},
          "componentDescription": {
            "type": "object",
            "properties": {
              "componentAnchor": {
                "type": "object",
                "properties": {
                  "intervalCodeAnchor": {
                    "type": "integer",
                    "minimum": 0,
                    "maximum": 33554431
                  },
                  "presentationTime": {"type": "integer", "minimum": 0, "maximum": 4294967295},
                  "presentationTimeMs": {"type": "integer", "minimum": 0, "maximum": 999}
                },
                "required": [
                  "intervalCodeAnchor",
                  "presentationTime",
                  "presentationTimeMs"
                ]
              },
              "mediaType": {
                "type": "string",
                "enum": [
                  "audio",
                  "video",
                  "both"
                ]
              },
              "descriptor": {
                "type": "string"
              },
              "priority": {
                "type": "integer",
                "minimum": 0,
                "maximum": 256
              }
            },
            "required": [
              "componentAnchor",
              "mediaType"
            ]
          }
        },
        "required": ["componentDescription"]
      },
      "querySpread": {"type": "integer"},
      "otherComponent": {
        "type": "object",
```

Fig. 34B

```
    "properties": {
        "serverCode": {"type": "integer"},
        "componentAnchor": {
            "type": "object",
            "properties": {
                "intervalCodeAnchor": {
                    "type": "integer",
                    "minimum": 0,
                    "maximum": 33554431
                },
                "presentationTime": {"type": "integer", "minimum": 0, "maximum": 4294967295},
                "presentationTimeMs": {"type": "integer", "minimum": 0, "maximum": 999}
            },
            "required": [
                "intervalCodeAnchor",
                "presentationTime",
                "presentationTimeMs"
            ]
        },
        "mediaType": {
            "type": "string",
            "enum": [
                "audio",
                "video",
                "both"
            ]
        },
        "Descriptor": {
            "type": "string"
        },
        "priority": {
            "type": "integer",
            "minimum": 0,
            "maximum": 255
        }
    },
    "required": [
        "componentAnchor",
        "mediaType"
    ]
}
},
"contentID": {
    "type": "array",
    "items": {
        "type": "object",
        "properties": {"oneOf": [
            {
                "type": {
                    "type": "string",
                    "enum": ["EIDR"]
                },
                "cid": {
                    "type": "string",
                    "pattern": "^10\\.5240\\/([0-9a-fA-F]{4}-){5}[0-9A-Z]$",
                    "minLength": 34,
                    "maxLength": 34
                },
                "validFrom": {
                    "type": "string",
                    "format": "date-time"
                },
```

Fig. 34C

```
            "validUntil": {
               "type": "string",
               "format": "date-time"
            }
         },
         {
            "type": {
               "type": "string",
               "enum": ["Ad-ID"]
            },
            "cid": {
               "type": "string",
               "pattern": "^[1-9a-zA-Z]{1}[0-9a-zA-Z]{10}(H|D)?$",
               "minLength": 11,
               "maxLength": 12
            },
            "validFrom": {
               "type": "string",
               "format": "date-time"
            },
            "validUntil": {
               "type": "string",
               "format": "date-time"
            }
         },
         {"type": "object"}
         ]}
      },
      "minItems": 0
   },
   "sourceID": { "type": "object",
      "properties": {
         "country": {"type": "string","pattern": "^[a-zA-Z]{2}$"},
         "bsid": { "type": "integer","minimum": 0, "maximum": 65535 },
         "majorChannelNo":{"type": "integer","minimum": 1, "maximum": 999 },
         "minorChannelNo":{"type": "integer","minimum": 1, "maximum": 999 }
      },
      "required": ["country","bsid","majorChannelNo","minorChannelNo"]
   },
"service": {
   "type": "object",
   "properties": {
      "serviceId": {
         "type": "integer",
         "minimum": 0,
         "maximum": 65535
      },
      "sltSvcSeqNum": {
         "type": "integer",
         "minimum": 0,
         "maximum": 255
      },
      "slsProtocol": {
         "type": "integer",
         "minimum": 0,
         "maximum": 255
      },
      "slsMajorProtocolVersion": {
         "type": "integer",
         "minimum": 0,
         "maximum": 255
      },
```

Fig. 34D

```
"slsMinorProtocolVersion": {
    "type": "integer",
    "minimum": 0,
    "maximum": 255
},
"svcInetUrl": {
    "type": "array",
    "items": {
        "type": "object",
        "properties": {
            "urlType": {
                "type": "integer",
                "minimum": 0,
                "maximum": 255
            },
            "urlValue": {
                "type": "string",
                "format": "url"
            }
        },
        "required": [
            "urlType",
            "urlValue"
        ]
    }
},
"required": [
    "serviceId",
    "sltSvcSeqNum"
]
}
}
},
"required": ["thisComponent","service"],
"additionalProperties": true
},
"required": ["RecoveryDataTable"]
}
```

Fig. 35A

```
{
    "$schema": "http://json-schema.org/draft-04/schema#",
    "id": "http://atsc.org/version/3.0/wm/recoveryfileformat#",
    "title": "Recovery file format schema",
    "description": "Return messages from server use this schema.",
    "@context": {"RecoveryDataTable": "http://www.atsc.org/contexts/3.0/RecoveryFFV1"},
    "RecoveryDataTable": {
      "type": "object",
      "properties": {
        "thisComponent": {
          "type": "object",
          "properties": {
            "serverCode": {"type": "integer"},
            "intervalCode": {"type": "integer"},
            "componentDescription": {
              "type": "object",
              "properties": {
                "componentAnchor": {
                  "type": "object",
                  "properties": {
                    "intervalCodeAnchor": {
                      "type": "integer",
                      "minimum": 0,
                      "maximum": 33554431
                    },
                    "presentationTime": {"type": "integer", "minimum": 0, "maximum": 4294967295},
                    "presentationTimeMs": {"type": "integer", "minimum": 0, "maximum": 999}
                  },
                  "required": [
                    "intervalCodeAnchor",
                    "presentationTime",
                    "presentationTimeMs"
                  ]
                },
                "mediaType": {
                  "type": "string",
                  "enum": [
                    "audio",
                    "video",
                    "both"
                  ]
                },
                "descriptor": {
                  "type": "string"
                },
                "priority": {
                  "type": "integer",
                  "minimum": 0,
                  "maximum": 255
                }
              },
              "required": [
                "componentAnchor",
                "mediaType"
```

Fig. 35B

```
                    ]
                  }
                },
                "required": ["componentDescription"]
              },
              "querySpread": {"type": "integer"},
              "otherComponent": {
                "type": "object",
                "properties": {
                "serverCode": {"type": "integer"},
                  "componentAnchor": {
                    "type": "object",
                    "properties": {
                      "intervalCodeAnchor": {
                        "type": "integer",
                        "minimum": 0,
                        "maximum": 33554431
                      },
                      "presentationTime": {"type": "integer", "minimum": 0, "maximum": 4294967295},
                      "presentationTimeMs": {"type": "integer", "minimum": 0, "maximum": 999}
                      },
                      "required": [
                        "intervalCodeAnchor",
                        "presentationTime",
                        "presentationTimeMs"
                      ]
                  },
                  "mediaType": {
                    "type": "string",
                    "enum": [
                      "audio",
                      "video",
                      "both"
                    ]
                  },
                  "Descriptor": {
                    "type": "string"
                  },
              },
                  "priority": {
                    "type": "integer",
                    "minimum": 0,
                    "maximum": 255
                  }
              },
              "required": [
                "componentAnchor",
                "mediaType"
              ]
            }
          }
        },
        "contentID": {
          "type": "array",
          "items": {
            "type": "object",
            "properties": {"oneOf": [
              {
```

Fig. 35C

```
        "type": {
          "type": "string",
          "enum": ["EIDR"]
        },
        "cid": {
          "type": "string",
          "pattern": "^10\\.5240\\/([0-9a-fA-F]{4}-){5}[0-9A-Z]$",
          "minLength": 34,
          "maxLength": 34
        },
        "validFrom": {
          "type": "string",
          "format": "date-time"
        },
        "validUntil": {
          "type": "string",
          "format": "date-time"
        }
      },
      {
        "type": {
          "type": "string",
          "enum": ["Ad-ID"]
        },
        "cid": {
          "type": "string",
          "pattern": "^[1-9a-zA-Z]{1}[0-9a-zA-Z]{10}(H|D)?$",
          "minLength": 11,
          "maxLength": 12
        },
        "validFrom": {
          "type": "string",
          "format": "date-time"
        },
        "validUntil": {
          "type": "string",
          "format": "date-time"
        }
      },
      {
        "type": {
          "type": "string"
        },
        "cid": {
          "type": "string"
        },
        "validFrom": {
          "type": "string",
          "format": "date-time"
        },
        "validUntil": {
          "type": "string",
          "format": "date-time"
        }
      },
      {"type": "object"}
```

Fig. 35D

```
      }}
    },
    "minItems": 0
  },
  "sourceID": { "type": "object",
      "properties": {
        "country": {"type": "string","pattern": "^[a-zA-Z]{2}$"},
        "bsid":  { "type": "integer","minimum": 0, "maximum": 65535 },
        "majorChannelNo":{"type": "integer","minimum": 1, "maximum": 999 },
        "minorChannelNo":{"type": "integer","minimum": 1, "maximum": 999 }
      },
      "required": ["country","bsid","majorChannelNo","minorChannelNo"]
  },
"service": {
    "type": "object",
    "properties": {
      "serviceId": {
        "type": "integer",
        "minimum": 0,
        "maximum": 65535
      },
      "sltSvcSeqNum": {
        "type": "integer",
        "minimum": 0,
        "maximum": 256
      },
      "slsProtocol": {
        "type": "integer",
        "minimum": 0,
        "maximum": 255
      },
      "slsMajorProtocolVersion": {
        "type": "integer",
        "minimum": 0,
        "maximum": 255
      },
      "slsMinorProtocolVersion": {
        "type": "integer",
        "minimum": 0,
        "maximum": 255
      },
      "svcInetUrl": {
        "type": "array",
        "items": {
          "type": "object",
          "properties": {
            "urlType": {
              "type": "integer",
              "minimum": 0,
              "maximum": 255
            },
            "urlValue": {
              "type": "string",
              "format": "uri"
            }
          },
```

Fig. 35E

```
            "required": [
              "urlType",
              "urlValue"
            ]
          }
        },
        "required": [
          "serviceId",
          "sltSvcSeqNum"
        ]
        }
      },
      "required": ["thisComponent","service"],
      "additionalProperties": true
    },
    "required": ["RecoveryDataTable"]
}
```

Fig. 36A

| Element or Attribute Name | | | Use | Data Type | Format |
|---|---|---|---|---|---|
| RecoveryDataTable | | | 1 | | Root element |
| | thisComponent | | 1 | | The media component from which the VP1 payload carrying serverCode and intervalCode was detected. |
| | | serverCode | 0..1 | integer | The serverCode value from the query request to which the recovery data table was provided as a response. |
| | | intervalCode | 0..1 | integer | The intervalCode value from the query request to which the recovery data table was provided as a response. |
| | | queryFlag | 0..1 | integer | An integer number having a value of 0 or 1 matching the queryFlag value in the VP1 payload associated with this RecoveryDataTable. |
| | | displayOverride | 0..1 | integer | An integer number having a value of 0 or 1 indicating whether a display override state was active at any part of the Cell related to the VP1 payload associated with this RecoveryDataTable. |
| | | componentDescription | 1 | object | The description of this component, as defined in FIG. 29 |
| | querySpread | | 0..1 | integer | Time in milliseconds over which device should randomly choose time for querying Dynamic Event Server when signaled by the "query_flag" in the VP1 payload. |
| | otherComponent | | 0..N | object | The audio or video components other than this component, which carries coincident VP1 payloads. |
| | contentID | | 0..N | | Content identifier |
| | | type | 1 | string | Defined values: "EIDR", "Ad-ID" |
| | | cid | 1 | string | Either an EIDR (34-character canonical form with hyphens or Ad-ID (11-character or 12-character canonical form) string or Ad-ID (the ASCII characters representing the decimal value of the 4-byte unsigned Integer Compact Ad-ID Identifier. |
| | | validFrom | 1 | string (date-time) | When contentID is valid from |
| | | validUntil | 0..1 | string(date-time) | Up to when contentID is valid until |
| | sourceID | | 0..1 | | |
| | | country | 1 | string | ISO 3166-1 alpha-2 country code associated with the primary administrative entity under which the given bsid is assigned. |
| | | bsid | 1 | integer | Identifier of the whole Broadcast Stream. The value of BSID shall be unique on a regional level (for example, North America). An administrative or regulatory authority may play a role. |
| | | majorChannelNo | 1 | integer | An integer number in the range 1 to 999 representing the "major" channel number of the service. |
| | | minorChannelNo | 1 | integer | An integer number in the range 1 to 999 representing the "minor" channel number of the service. |
| | service | | 1 | | |
| | | serviceId | 1 | integer | Number that shall uniquely identify this service within the scope of bsid. |

| sltSvcSeqNum | 1 | integer | Version of service information in this table — increments by one for each new version of service data in RDT; wraps around to 0. |
|---|---|---|---|
| slsProtocol | 0..1 | integer | Protocol used to deliver the service layer signaling for this service (See FIG. 31). |
| slsMajorProtocolVersion | 0..1 | integer | Major version number of the protocol used to deliver the service layer signaling for this service. |
| slsMinorProtocolVersion | 0..1 | integer | Minor version number of the protocol used to deliver the service layer signaling for this service. |
| svcInetUrl | 0..N | | |
| urlType | 1 | unsignedByte | Type of files available with this URL |
| urlValue | 1 | string (uri) | URL to access Internet signaling files for this service. |

```
{
  "$schema": "http://json-schema.org/draft-04/schema#",
  "id": "http://atsc.org/version/3.0/wm/recoveryfileformat#",
  "title": "Recovery File format schema",
  "description": "Return messages from server use this schema.",
  "@context": {"RecoveryDataTable": "http://www.atsc.org/contexts/3.0/RecoveryFFV1"},
  "RecoveryDataTable": {
    "type": "object",
    "properties": {
      "thisComponent": {
        "type": "object",
        "properties": {
          "serverCode": {"type": "integer"},
          "intervalCode": {"type": "integer"},
          "componentDescription": {
            "type": "object",
            "properties": {
              "componentAnchor": {
                "type": "object",
                "properties": {
                  "intervalCodeAnchor": {
                    "type": "integer",
                    "minimum": 0,
                    "maximum": 33554431
                  },
                  "presentationTime": {"type": "integer", "minimum": 0, "maximum": 4294967295},
                  "presentationTimeMs": {"type": "integer", "minimum": 0, "maximum": 999}
                },
                "required": [
                  "intervalCodeAnchor",
                  "presentationTime",
                  "presentationTimeMs"
                ]
              },
              "mediaType": {
                "type": "string",
                "enum": [
                  "audio",
                  "video",
                  "both"
                ]
              },
              "descriptor": {
                "type": "string"
              },
              "priority": {
                "type": "integer",
                "minimum": 0,
                "maximum": 255
              }
            },
            "required": [
              "componentAnchor",
              "mediaType"
```

Fig. 37B

```
            ]
          }
        },
        "required": ["componentDescription"]
      },
      "querySpread": {"type": "integer"},
      "otherComponent": {
        "type": "object",
        "properties": {
          "componentAnchor": {
            "type": "object",
            "properties": {
              "intervalCodeAnchor": {
                "type": "integer",
                "minimum": 0,
                "maximum": 33554431
              },
              "presentationTime": {"type": "integer", "minimum": 0, "maximum": 4294967295},
              "presentationTimeMs": {"type": "integer", "minimum": 0, "maximum": 999}
            },
            "required": [
              "intervalCodeAnchor",
              "presentationTime",
              "presentationTimeMs"
            ]
          },
          "mediaType": {
            "type": "string",
            "enum": [
              "audio",
              "video",
              "both"
            ]
          },
          "Descriptor": {
            "type": "string"
          },
          "priority": {
            "type": "integer",
            "minimum": 0,
            "maximum": 255
          }
        },
        "required": [
          "componentAnchor",
          "mediaType"
        ]
      }
    },
    "contentID": {
      "type": "array",
      "items": {
        "type": "object",
        "properties": {"oneOf": [
          {
            "Type": {
```

Fig. 37C

```
        "type": "string",
        "enum": ["EIDR"]
      },
      "cid": {
        "type": "string",
        "pattern": "^10\\.5240\\/([0-9a-fA-F]{4}-){5}[0-9A-Z]$",
        "minLength": 34,
        "maxLength": 34
      },
      "validFrom": {
        "type": "string",
        "format": "date-time"
      },
      "validUntil": {
        "type": "string",
        "format": "date-time"
      }
    },
    {
      "type": {
        "type": "string",
        "enum": ["AD-ID"]
      },
      "cid": {
        "type": "string",
        "pattern": "^[1-9a-zA-Z]{1}[0-9a-zA-Z]{10}(H|D)? |^[0-9]{1,10}$",
        "maxLength": 12
      },
      "validFrom": {
        "type": "string",
        "format": "date-time"
      },
      "validUntil": {
        "type": "string",
        "format": "date-time"
      }
    },
    {
      "type": {
        "type": "string"
      },
      "cid": {
        "type": "string"
      },
      "validFrom": {
        "type": "string",
        "format": "date-time"
      },
      "validUntil": {
        "type": "string",
        "format": "date-time"
      }
    },
    {"type": "object"}
  ]
},
```

Fig. 37D

```
            "minItems": 0
        },
        "sourceID": { "type": "object",
            "properties": {
                "country": {"type": "string","pattern": "^[a-zA-Z]{2}$"},
                "bsid":    { "type": "integer","minimum": 0, "maximum": 65535 },
                "majorChannelNo":{"type": "integer","minimum": 1, "maximum": 999 },
                "minorChannelNo":{"type": "integer","minimum": 1, "maximum": 999 }
            },
            "required": ["country","bsid","majorChannelNo","minorChannelNo"]
        },
"service": {
    "type": "object",
    "properties": {
        "serviceId": {
            "type": "integer",
            "minimum": 0,
            "maximum": 65535
        },
        "sltSvcSeqNum": {
            "type": "integer",
            "minimum": 0,
            "maximum": 255
        },
        "slsProtocol": {
            "type": "integer",
            "minimum": 0,
            "maximum": 255
        },
        "slsMajorProtocolVersion": {
            "type": "integer",
            "minimum": 0,
            "maximum": 255
        },
        "slsMinorProtocolVersion": {
            "type": "integer",
            "minimum": 0,
            "maximum": 255
        },
        "svcInetUrl": {
        "type": "array",
        "items": {
            "type": "object",
            "properties": {
                "urlType": {
                    "type": "integer",
                    "minimum": 0,
                    "maximum": 255
                },
                "urlValue": {
                    "type": "string",
                    "format": "uri"
                }
            },
            "required": [
                "urlType",
```

Fig. 37E

```
                "urlValue"
            ]
          }
        },
        "required": [
          "serviceId",
          "sltSvcSeqNum"
        ]
      }
    },
    "required": ["thisComponent","service"],
    "additionalProperties": true
  },
  "required": ["RecoveryDataTable"]
}
```

RECOVERY DATA WITH CONTENT IDENTIFIERS

TECHNICAL FIELD

The present invention relates generally to a system with audio-visual content watermarking.

BACKGROUND ART

In many digital broadcasting systems, a broadcasting station transmits audio-visual content and one or more enhanced service data. The enhanced service data may be provided with the audio-visual (AV) content to provide information and services or may be provided separately from the AV content to provide information and services.

In many broadcasting environments, the AV content and the one or more enhanced service data is not received directly by an AV presentation device from the broadcasting station. Rather the AV presentation device, such as a television, is typically connected to a broadcast receiving device that receives the AV content and the one or more enhanced service data in a compressed form and provides uncompressed AV content to the AV presentation device.

In some broadcasting environments, the broadcast receiving device receives AV content from a server (sometimes referred to as a Multichannel Video Programming Distributor (MVPD). The MVPD receives an AV broadcast signal from the broadcasting station, extracts content from the received AV broadcast signal, converts the extracted content into AV signals having a suitable format for transmission, and provides the converted AV signals to the broadcast receiving device. During the conversion process, the MVPD often removes the enhanced service data provided from the broadcasting station or may incorporate a different enhanced service data that is provided to the broadcast receiving device. In this manner, the broadcasting station may provide the AV content with enhanced service data, but the enhanced service data, if any, that is ultimately provided to the AV presentation device and/or the broadcast receiving device may not be the same as that provided by the broadcasting station.

SUMMARY OF INVENTION

Technical Problem

Since the broadcast receiving device extracts AV content from the signal received from the MVPD and provides only uncompressed AV data to the AV presentation device, only enhanced service data provided to the broadcast receiving device is available. Furthermore, the same enhanced service data provided by the broadcasting station may not be provided to the broadcast receiving device and/or AV presentation device.

Solution to Problem

According to one embodiment of the present invention, there is provided a method for receiving a recovery file format file from a provider comprising the steps of:
(a) receiving a recovery data table including a RecoveryDataTable element;
(b) receiving a contentID field of said RecoveryDataTable element describing a type of content identifier provided in a message having a cardinality of 0 . . . N;
(c) receiving a svcInetUrl field of said RecoveryDataTable element describing service information;
(d) receiving a URLValue field of said svcInetUrl field describing URL to access Internet signaling files for said service information;
(e) decoding elements of said file based upon said recovery data table.

According to one embodiment of the present invention, there is provided a receiver receiving a recovery file format file from a provider comprising the steps of:
(a) said receiver receiving a recovery data table including a RecoveryDataTable element;
(b) said receiver receiving a contentID field of said RecoveryDataTable element describing a type of content identifier provided in a message having a cardinality of 0 . . . N;
(c) said receiver receiving a svcInetUrl field of said RecoveryDataTable element describing service information;
(d) receiving a URLValue field of said svcInetUrl field describing URL to access Internet signaling files for said service information;
(e) said receiver decoding elements of said file based upon said recovery data table.

Advantageous Effects of Invention

The foregoing and other objectives, features, and advantages of the invention will be more readily understood upon consideration of the following detailed description of the invention, taken in conjunction with the accompanying drawings.

BRIEF DESCRIPTION OF DRAWINGS

FIG. 13 illustrates a standards development organization (SDO) private data.

FIG. 14 illustrates metadata encapsulated within SDO private data as a SDO payload using one or more cmdIDs.

FIG. 15 illustrates an exemplary JavaScript Object Notation schema.

FIG. 16B illustrates the left half part of FIG. 16A.

FIG. 16C illustrates the lower half part of FIG. 16A.

FIG. 17 illustrates an exemplary watermark associated information retrieval JavaScript Object Notation schema.

FIG. 18 illustrates an exemplary recovery file format JavaScript Object Notation schema.

FIG. 19 illustrates an exemplary watermark associated information retrieval JavaScript Object Notation schema.

FIG. 20 illustrates an exemplary recovery file format JavaScript Object Notation schema.

FIG. 21 illustrates an exemplary recovery file format JavaScript Object Notation schema.

FIG. 22 illustrates an exemplary recovery file format logical structure.

FIG. 23 illustrates an exemplary component description logical structure.

FIG. 24A illustrate an exemplary component anchor logical structure.

FIG. 24B illustrate an exemplary component anchor logical structure.

FIG. 24C illustrate an exemplary component anchor logical structure.

FIG. 25A illustrates an exemplary recovery file format JavaScript Object Notation schema.

FIG. 25B illustrates an exemplary recovery file format JavaScript Object Notation schema.

FIG. 25C illustrates an exemplary recovery file format JavaScript Object Notation schema.

FIG. 25D illustrates an exemplary recovery file format JavaScript Object Notation schema.

FIG. 26A illustrates an exemplary recovery file format JavaScript Object Notation schema.

FIG. 26B illustrates an exemplary recovery file format JavaScript Object Notation schema.

FIG. 26C illustrates an exemplary recovery file format JavaScript Object Notation schema.

FIG. 26D illustrates an exemplary recovery file format JavaScript Object Notation schema.

FIG. 27A illustrates an exemplary recovery file format JavaScript Object Notation schema.

FIG. 27B illustrates an exemplary recovery file format JavaScript Object Notation schema.

FIG. 27C illustrates an exemplary recovery file format JavaScript Object Notation schema.

FIG. 27D illustrates an exemplary recovery file format JavaScript Object Notation schema.

FIG. 28 illustrates an exemplary recovery file format logical structure.

FIG. 29 illustrates an exemplary component description logical structure.

FIG. 30 illustrates an exemplary component anchor logical structure.

FIG. 31 illustrates exemplary slsProtocol values.

FIG. 32 illustrates exemplary urlType values.

FIG. 33A illustrates an exemplary recovery file format JavaScript Object Notation schema.

FIG. 33B illustrates an exemplary recovery file format JavaScript Object Notation schema.

FIG. 33C illustrates an exemplary recovery file format JavaScript Object Notation schema.

FIG. 33D illustrates an exemplary recovery file format JavaScript Object Notation schema.

FIG. 33E illustrates an exemplary recovery file format JavaScript Object Notation schema.

FIG. 34A illustrates an exemplary recovery file format JavaScript Object Notation schema.

FIG. 34B illustrates an exemplary recovery file format JavaScript Object Notation schema.

FIG. 34C illustrates an exemplary recovery file format JavaScript Object Notation schema.

FIG. 34D illustrates an exemplary recovery file format JavaScript Object Notation schema.

FIG. 35A illustrates an exemplary recovery file format JavaScript Object Notation schema.

FIG. 35B illustrates an exemplary recovery file format JavaScript Object Notation schema.

FIG. 35C illustrates an exemplary recovery file format JavaScript Object Notation schema.

FIG. 35D illustrates an exemplary recovery file format JavaScript Object Notation schema.

FIG. 35E illustrates an exemplary recovery file format JavaScript Object Notation schema.

FIG. 36A illustrates an exemplary recovery file format logical structure.

FIG. 36B illustrates an exemplary recovery file format logical structure.

FIG. 37A illustrates an exemplary recovery file format JavaScript Object Notation schema.

FIG. 37B illustrates an exemplary recovery file format JavaScript Object Notation schema.

FIG. 37C illustrates an exemplary recovery file format JavaScript Object Notation schema.

FIG. 37D illustrates an exemplary recovery file format JavaScript Object Notation schema.

FIG. 37E illustrates an exemplary recovery file format JavaScript Object Notation schema.

DESCRIPTION OF EMBODIMENTS

Figure 1:
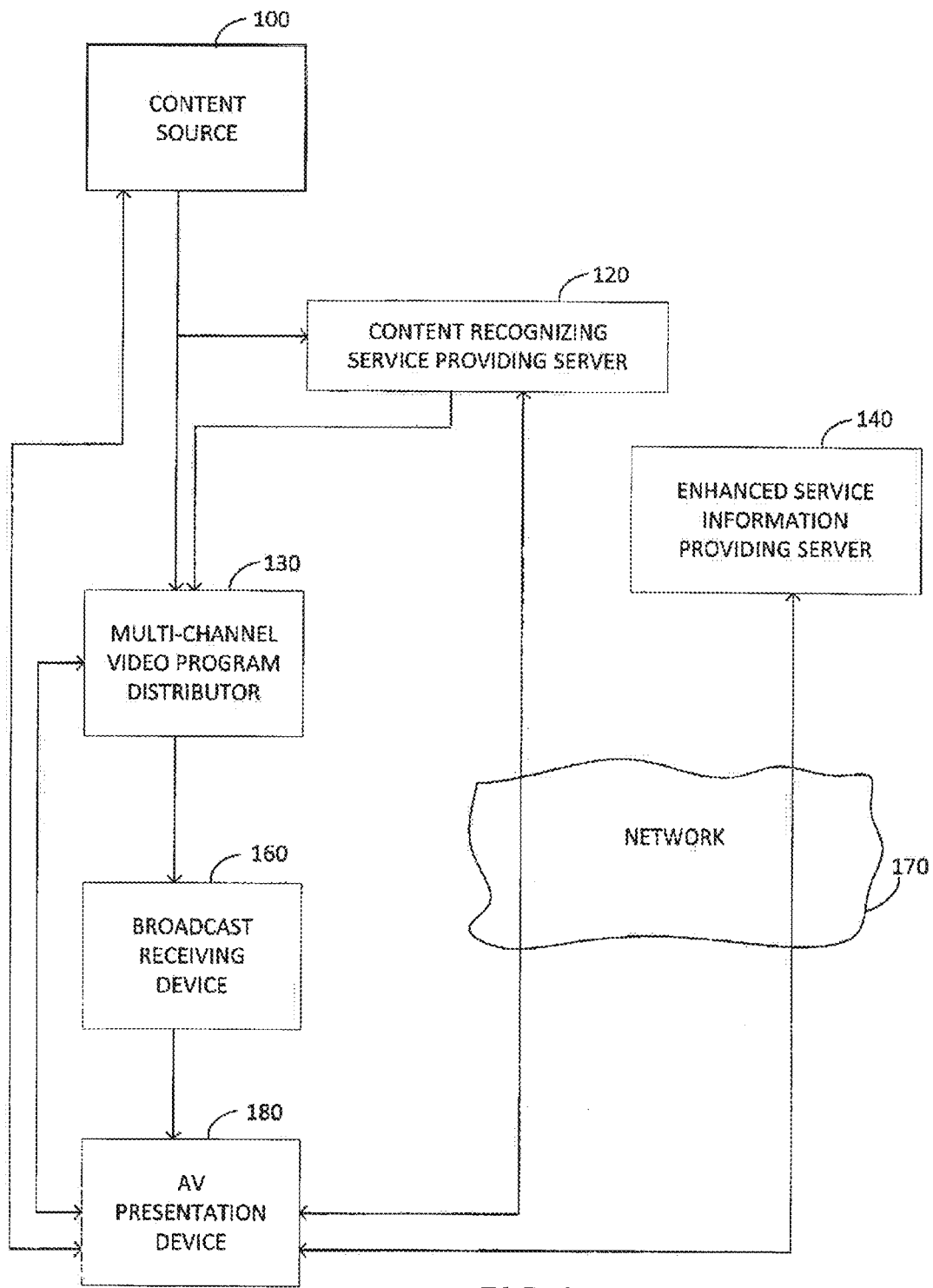
FIG. 1 illustrates a system with enhanced service information.

Referring to FIG. 1, the system may include a content source 100, a content recognizing service providing server 120, a MVPD 130, an enhanced service information providing server 140, a broadcast receiving device 160, a network 170, and an AV presentation device 180.

The content source 100 may correspond to a broadcasting station that broadcasts a broadcast signal including one or more streams of AV content (e.g., audio and/or video). The broadcasting station may use Advanced Television systems Committee (ATSC) emission specifications. The broadcast signal may further include enhanced services data and/or signaling information. The enhanced services data preferably relates to one or more of the AV broadcast streams. The enhanced data services may have any suitable format, such as for example, service information, metadata, additional data, compiled execution files, web applications, hypertext markup language (HTML) documents, extensible markup language (XML) documents, cascading style sheet (CSS) documents, audio files, video files, ATSC, future versions contents, and addresses such as a uniform resource locator (URL).

The content recognizing service providing server 120 provides a content recognizing service that allows the AV presentation device 180 to recognize content on the basis of AV content from the content source 100. The content recognizing service providing server 120 may optionally modify the AV broadcast content, such as by including a watermark.

The content recognizing service providing server 120 may include a watermark inserter. The watermark inserter may insert watermarks which are designed to carry enhanced services data and/or signaling information, while being imperceptible or at least minimally intrusive to viewers. In other cases a readily observable watermark may be inserted (e.g., readily observable may be readily visible in the image and/or readily observable may be readily audible in the audio). For example, the readily observable watermark may be a logo, such as a logo of a content provider at the upper-left or upper-right of each frame.

The content recognizing service providing server 120 may include a watermark inserter that modifies the AV content to include a non-readily observable watermark (e.g., non-readily observable may be readily non-visible in the image and/or non-readily observable may be non-readily audible in the audio). For example, the non-readily observable watermark may include security information, tracking information, data, or otherwise. Another example includes the channel, content, timing, triggers, and/or URL information.

The MVPD 130 receives broadcast signals from one or more broadcasting stations and typically provides multiplexed broadcast signals to the broadcast receiving device 160. The MVPD 130 may perform demodulation and channel decoding on the received broadcast signals to extract the AV content and enhanced service data. The MVPD 130 may also perform channel encoding on the extracted AV content and enhanced service data to generate a multiplexed signal for further distribution. The MVPD 130 may exclude the extracted enhanced service data and/or may include a different enhanced service data.

The broadcast receiving device 160 may tune to a channel selected by a user and receive an AV signal of the tuned channel. The broadcast receiving device 160 typically performs demodulation and channel decoding on the received signal to extract desired AV content. The broadcast receiving device 160 decodes the extracted AV content using any suitable technique, such as for example, a H.264, a Motion Picture Experts Group (MPEG) Advanced Video Coding (AVC), an H.265, a High Efficiency Video Coding (HEVC), a Dolby Digital (AC3), and/or an Advanced Audio Coding (AAC) system. The broadcast receiving device 160 typically provides uncompressed AV content to the AV presentation device 180.

The enhanced service information providing server 140 provides enhanced service information to AV content in response to a request from the AV presentation device 180.

The AV presentation device 180 may include a display, such as for example, a television, a notebook computer, a mobile phone, and a smart phone. The AV presentation device 180 may receive uncompressed (or compressed) AV or video or audio content from the broadcast receiving device 160, a broadcast signal including encoded AV or video or audio content from the content source 100, and/or encoded or decoded AV or video or audio content from the MVPD 130. In some cases the uncompressed video and audio may be received via an High-Definition Multimedia Interface (HDMI) cable. The AV presentation device 180 may receive from the content recognizing service providing server 120 through the network 170, an address of an enhanced service relating to the AV content from the enhanced service information providing server 140.

It is to be understood that the content source 100, the content recognizing service providing server 120, the MVPD 130, and the enhanced service information providing server 140 may be combined, or omitted, as desired. It is to be understood that these are logical roles. In some case some of these entities may be separate physical devices. In other cases some of these logical entities may be embodied in same physical device. For example, the broadcast receiving device 160 and AV presentation device 180 may be combined, if desired.

Figure 2:
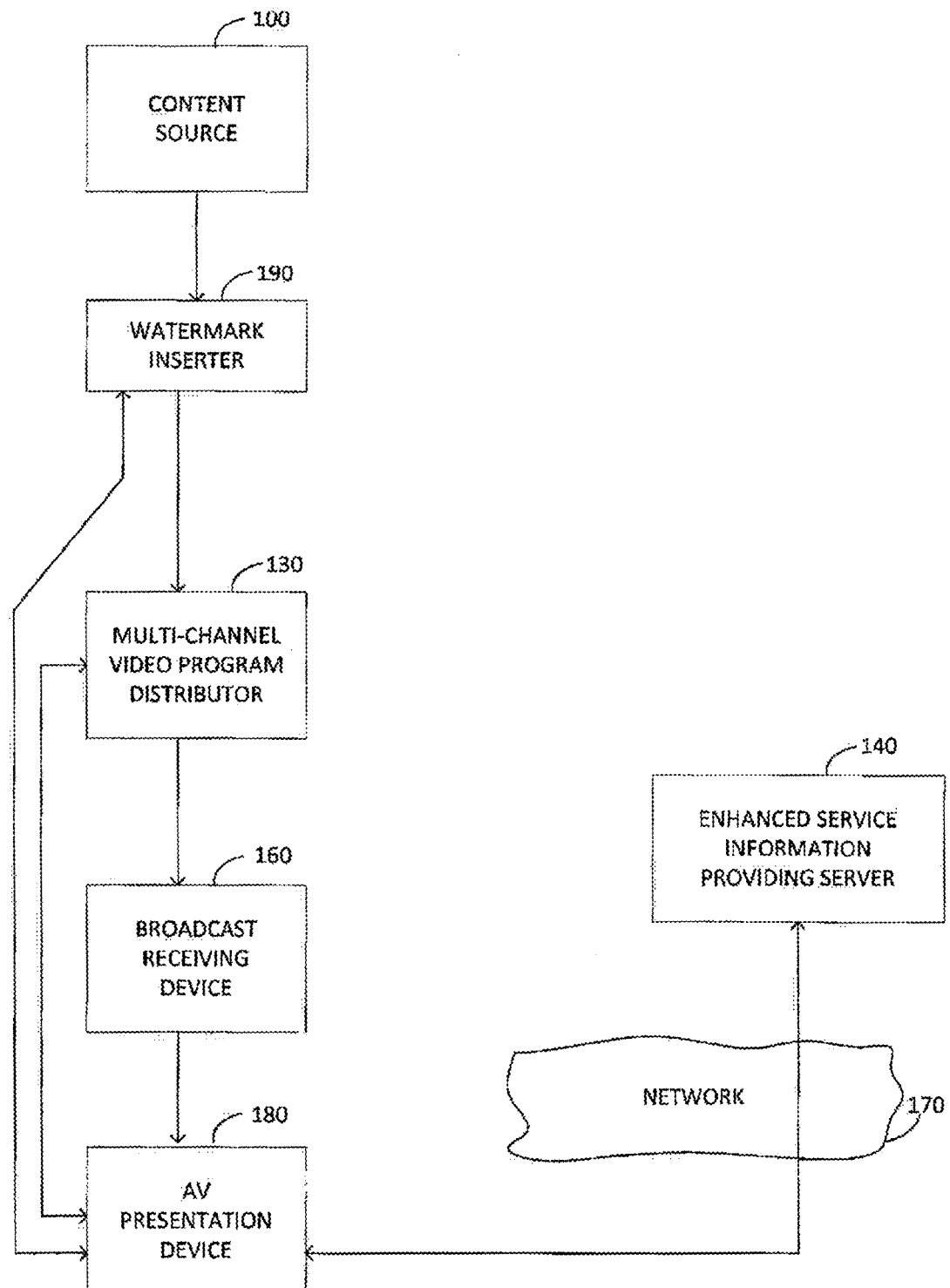
FIG. 2 illustrates another system with enhanced information.

Referring to FIG. 2, a modified system may include a watermark inserter 190. The watermark inserter 190 may modify the AV (e.g., the audio and/or video) content to include additional information in the AV content. The MVPD 130 may receive and distribute a broadcast signal including the modified AV content with the watermark.

The watermark inserter 190 preferably modifies the signal in a manner that includes additional information which is non-readily observable (e.g., visually and/or audibly) in the form of digital information. In non-readily observable watermarking, the inserted information may be readily identifiable in the audio and/or video. In non-readily observable watermarking, although information is included in the AV content (e.g., the audio and/or video), a user is not readily aware of the information.

One use for the watermarking is copyright protection for inhibiting illegal copying of digital media. Another use for the watermarking is source tracking of digital media. A further use for the watermarking is descriptive information for the digital media. Yet another use for the watermarking is providing location information for where additional content may be received associated with the digital media. Yet another use is to identify content and content source that is being viewed and the current time point in the content, and then allowing the device to access the desired additional functionality via an Internet connection. The watermark information is included within the AV content itself, as distinguished from, meta-data that is delivered along with the AV content. By way of example, the watermark information may be included by using a spread spectrum technique, a quantization technique, and/or an amplitude modulation technique.

Figure 3:
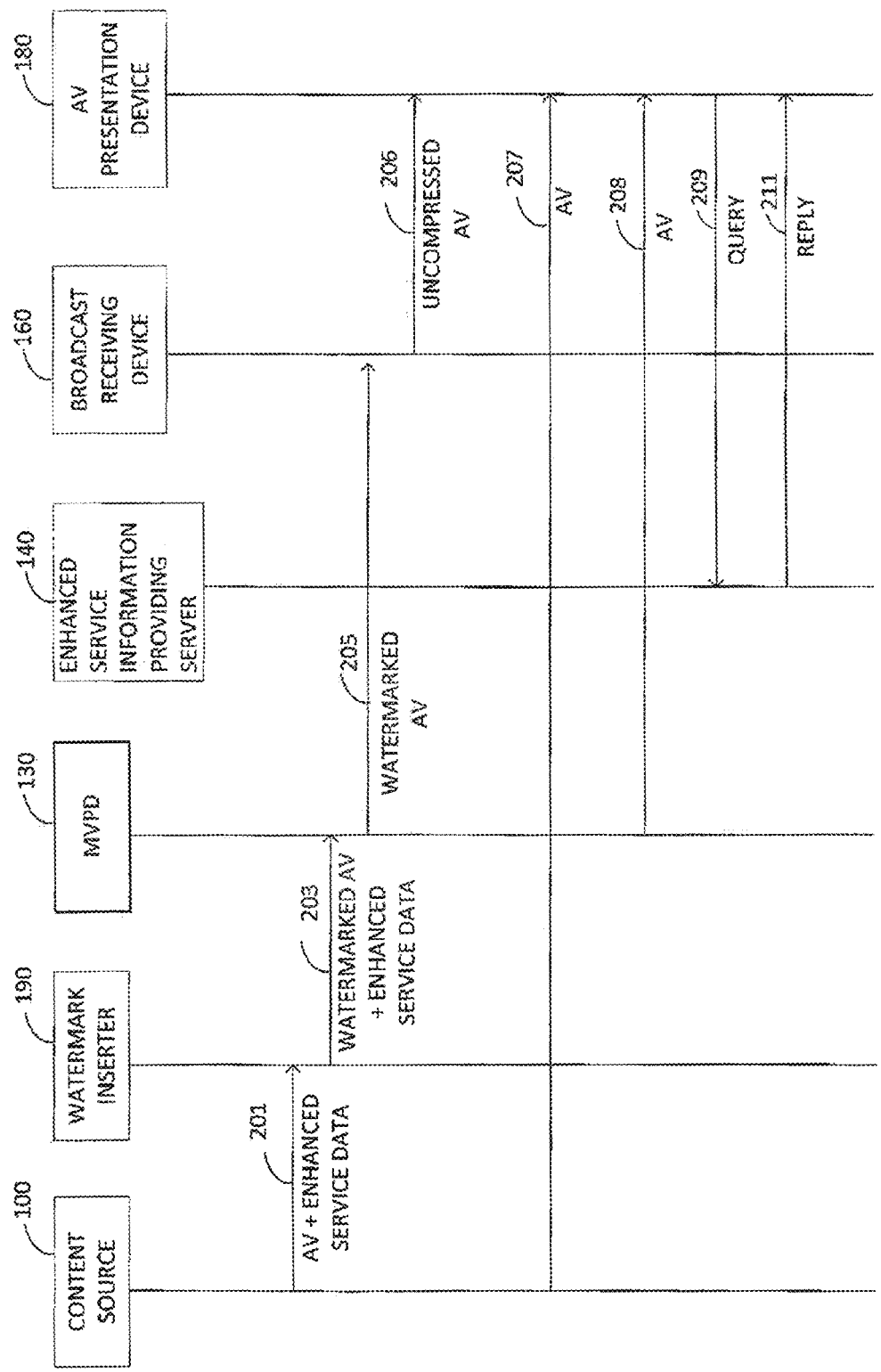
FIG. 3 illustrates a data flow for a system with enhanced information.

Referring to FIG. 3, an exemplary data flow is illustrated. The content source 100 transmits a broadcast signal including at least one AV content and an enhanced service data 201 to the watermark inserter 190.

The watermark inserter 190 receives the broadcast signal that the content source 100 provides and includes a readily observable and/or a non-readily observable watermark in the AV content. The modified AV content with the watermark is provided together with enhanced service data 203 to the MVPD 130.

The content information associated with the watermark may include, for example, identification information of a content provider that provides AV content, AV content identification (ContentID) information, time information of a content section used in content information acquisition, names of channels through which AV content is broadcasted, logos of channels through which AV content is broadcasted, descriptions of channels through which the AV content is broadcasted, a usage information reporting period, the minimum usage time for usage information acquisition, statistics for sporting events, display of useful information, widgets, applications, executables, and/or available enhanced service information relating to AV content.

The acquisition path of available enhanced service data may be represented in any manner, such an Internet Protocol (IP) based path or an ATSC-Mobile Handheld path.

The MVPD 130 receives broadcast signals including watermarked AV content and enhanced data service and may generate a multiplexed signal to provide it 205 to the broadcast receiving device 160. At this point, the multiplexed signal may exclude the received enhanced service data and/or may include a different enhanced service data.

The broadcast receiving device 160 may tune to a channel that a user selects and receives signals of the tuned channel, demodulates the received signals, performs channel decoding and audio-video decoding on the demodulated signals to generate an uncompressed audio-video content, and then, provide 206 the uncompressed AV content to the AV presentation device 180. The content source 100 may also broadcast 207 the AV content through a channel to the AV presentation device 180. The MVPD 130 may directly transmit 208 a broadcast signal including AV content to the AV presentation device 180 without going through the broadcast receiving device 160. In yet another case some of the AV information may be sent to the AV presentation device 180 over a broadband connection. In some cases this may be managed broadband connection. In another case it may be unmanaged broadband connection.

The AV presentation device 180 may receive uncompressed (or compressed) AV content from the broadcast receiving device 160. Additionally, the AV presentation device 180 may receive a broadcast signal through a channel from the content source 100, and then, may demodulate and decode the received broadcast signal to obtain AV content. Additionally, the AV presentation device 180 may receive a broadcast signal from the MVPD 130, and then, may demodulate and decode the received broadcast signal to obtain AV content. The AV presentation device 180 (or broadcast receiving device 160) extracts watermark information from one or more video frames or a selection of audio samples of the received AV content. The AV presentation device 180 may use the information obtained from the watermark(s) to make a request 209 to the enhanced service information providing server 140 (or any other device) for additional information. The enhanced service information providing server 140 may provide, in response thereto a reply 211.

Figure 4:
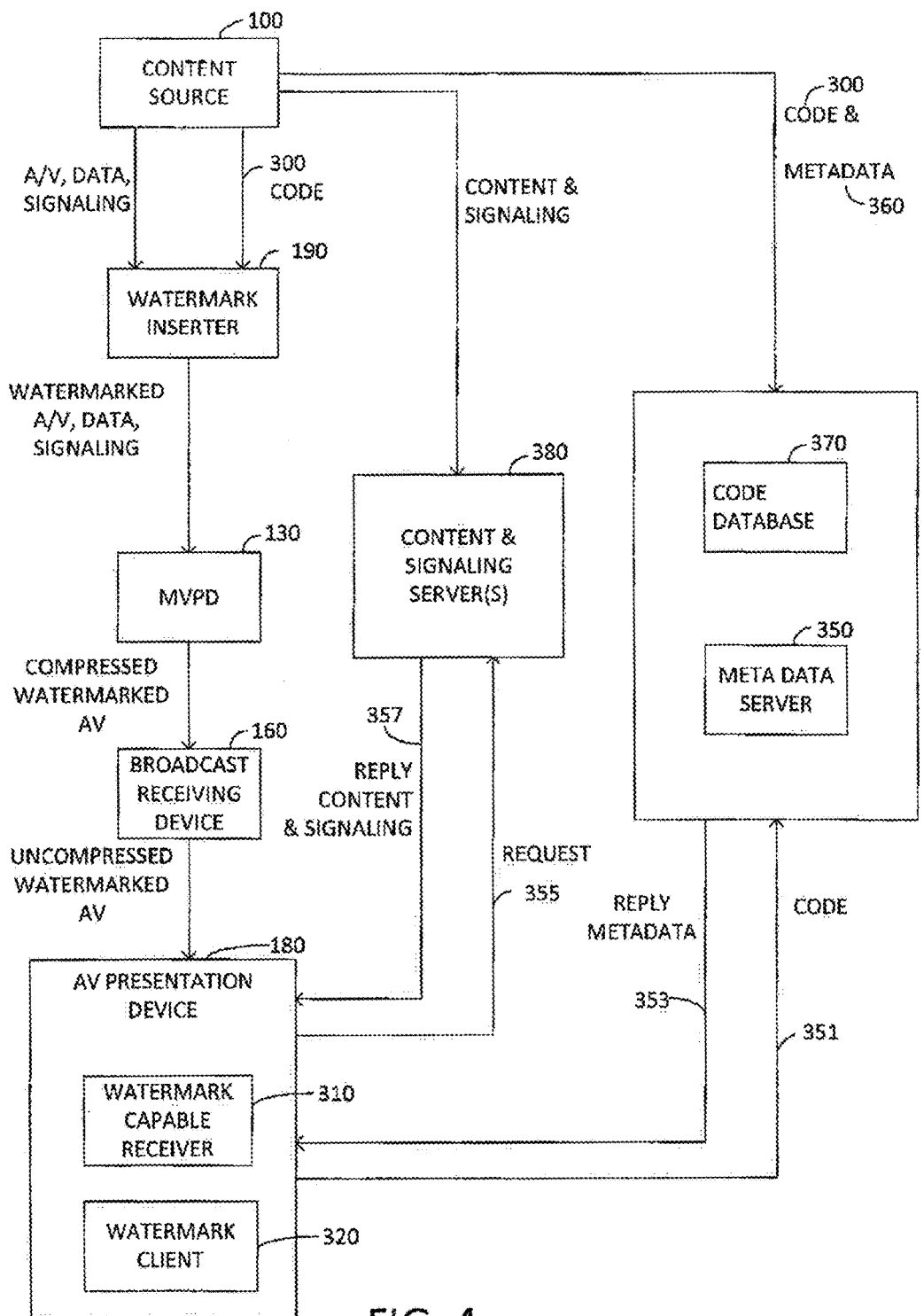
FIG. 4 illustrates another system with enhanced information.

Referring to FIG. 4, a further example includes the content source 100 that provides AV content together with enhanced service data (if desired) to the watermark inserter 190. In addition, the content source 100 may provide a code 300 to the watermark inserter 190 together with the AV content. The code 300 may be any suitable code to identify which, among a plurality of AV streams, should be modified with the watermark. For example code=1 may identify the first AV stream, code=2 may identify the second AV stream, code=3 may identify the third AV stream, code=4 may identify the fourth AV stream, etc. The code may include temporal location information within the AV content. The code may include other metadata, if desired.

The watermarked AV content and associated data, signaling is provided by the watermark inserter 190 to the MVPD, which in turn may provide the watermarked compressed AV content to the broadcast receiving device 160 (e.g., a set top box). The broadcast receiving device 160 may provide watermarked AV content (e.g., typically uncompressed) to the AV presentation device 180. The AV presentation device 180 may include a watermark capable receiver 310 together with a watermark client 320. The watermark capable receiver 310 is suitable to detect the existence of the watermark within the AV content, and to extract the watermark data from within the AV content. The watermark client 320 is suitable to use the data extracted from the watermark to request additional data based thereon, and subsequently use this additional data in a suitable manner.

The AV presentation device 180 may use the code 300 from the extracted watermark to make a request to a metadata server 350. A code database 370 receives the data from the content source 100 that includes the code 300 and metadata 360. The code 300 and metadata 360 is stored in the code database 370 for subsequent use. In this manner, the code 300 that is provided to the watermark inserter 190 which is encoded within the AV content is also stored in the code database 370 together with its metadata 360. In the event that the MVPD 130, or otherwise, removes the associated metadata or otherwise changes the associated metadata, it is recoverable by the AV presentation device 180 from the metadata server 350 which uses the provided code 351 to query the code database 370 and provide an associated response with the metadata 353 to the AV presentation device 180. The reply metadata provided by the metadata server 350 is used by the AV presentation device 180 to form a request 355 that is provided to the content and signaling server 380. The content and signaling server 380, in response to the request, provides selected content and signaling 357 to the AV presentation device 180. In general, the content and signaling server 380 may be different from the metadata server 350.

However, making a first request to the metadata server to obtain a response to the code provided, then subsequently using the metadata to provide a request to the content and signaling server 380 is burdensome, and prone to failure, due to the two different servers and/or requests that are utilized. Additionally it may increase the latency.

By way of example, the metadata may consist of one or more of the following syntax elements:

(1) location of content and signaling server (e.g., where is the server, such as its network address. Examples of network addresses are domain names, IP v4 addresses, etc.);

(2) protocol to be used for communication with the content and signaling server; for example, the Hypertext Transfer Protocol Secure (HTTPS) or the Hypertext Transfer Protocol (HTTP);

(3) time code identifying a temporal location in the AV content (e.g., where the metadata should be associated with in the AV content);

(4) time sensitive event trigger (e.g., an advertisement or an event for a particular location in the AV content);

(5) channel identification (e.g., channel specific information; local channel content);

(6) duration over which the content and signaling server requests are randomly carried out by client (e.g., for load balancing). For brevity, this syntax element may also be referred to as duration for content server requests;

(7) etc.

The watermark(s) embedded in the audio-video content typically have a capacity to carry only a few bits of payload information when the watermarked audio-video broadcast has non-readily observable information. For relatively small payload sizes, the time code (element 3 above) and/or the location of the content and signaling server (element 1 above) tends to take on a significant percentage of the available payload leaving limited additional payload for the remaining data, which tends to be problematic.

To include sufficient metadata within the watermark, so that both the time code and the location information may be provided together with additional information, it may be desirable to partition the metadata across multiple watermark payloads. Each of the watermark payloads is likewise preferably included within different portions of the AV content. The data extracted from the multiple watermark payloads are combined together to form a set of desirable information to be used to make a request. In the description below the term payload may be used to indicate watermark payload. Each of the syntax elements may be included within a single payload, spanned across multiple payloads, and/or fragmented across multiple payloads. Each payload may be assigned a payload type for purposes of identification. Further, an association may be established between multiple payloads belonging to the same or approximately the same timeline location. Also, the association may be uni-directional or bi-directional, as desired.

The desired time code data may be obtained from payload(s) that span across several temporal locations of the AV content. Therefore some systems may establish rules to associate the determined time code with a particular temporal location of the AV content. In an example, the chosen temporal location may correspond to the temporal location at the end of a pre-determined watermark payload.

For example, the payload size may be 50 bits while the desirable metadata may be 70 bits, thus exceeding the payload size of a single watermark. An example of the desirable metadata may be as follows:

| | |
|---|---|
| location of content and server (I) | 32 bits (IP address) |
| application layer protocol (A) | 1 bit (HTTP or HTTPS) |
| time code (T) | 25 bits (for 1 year of uniqueness with a granularity of 1 second) |
| time sensitive trigger (D) | 1 bit (A value of 1 indicates the AV presentation device should query for interactive content. A value of 0 indicates the AV presentation device should not query for interactive content (e.g. as in time base trigger)). |
| channel identification (L) | 9 bits |
| duration for content server requests (R) | 2 bits |

Another example of the desirable metadata may be as follows:

| | |
|---|---|
| location of content and server (I) | 32 bits (IP address) |
| application layer protocol (A) | 2 bit (00 = HTTP, 01 = HTTPS, 10 = reserved, 11 = reserved) |
| time code (T) | 25 bits (for 1 year of uniqueness with a granularity of 1 second) |
| time sensitive trigger (D) | 1 bit |
| channel identification (L) | 9 bits |
| duration for content server requests (R) | 2 bits |

One manner of partitioning the metadata is to include the content and signal server communication information (CSSCI) in one payload and timeline information in another payload. The CSSCI payload may include, for example, where information (e.g., location of content and signaling server), association information (e.g., an identifier to associate the CSSCI payload with one or more other payloads), and how information (e.g., application layer protocol, duration for content server requests). The timeline information may include, for example, association information (e.g., an identifier to associate the timeline with one or more other payloads), when information (e.g., time code information), and which information (e.g., channel identification).

Figure 5:
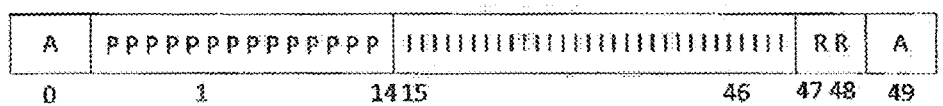
FIG. 5 illustrates a watermark payload.

Referring to FIG. 5, an exemplary CSSCI payload is illustrated.

Figures 6, 7:
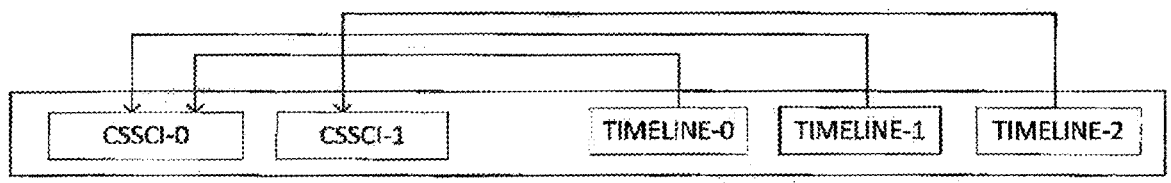
FIG. 6 illustrates another watermark payload.
FIG. 7 illustrates relationships between watermark payloads.

Referring to FIG. 6, an exemplary time location payload is illustrated. The term time location may be alternatively used in place of the term temporal location.

The payload type may be identified by the first bit, "Y". When Y is set to 0 the payload corresponds to CSSCI payload and the 14 bit payload identifier (P) is used to label the CSSCI. When Y is set to 1 the payload corresponds to the temporal location payload and the 14 bit payload identifier (P) signals the corresponding CSSCI. As a result, different payload types with same payload identifier (P) value are associated with each other. The identifier R indicates a time duration over which to spread the content and signaling server requests. In an example, Y may correspond to a 2-bit field where the value 00 indicates a CSSCI payload, the value 01 indicates a temporal location payload and the values 10, 11 are reserved for future use.

Referring to FIG. 7, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads.

As illustrated, each temporal location payload is associated with a previously received CSSCI type payload, and thus unidirectional in its association. In the event that a previous CSSCI type payload matching a temporal location payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

Figure 8:
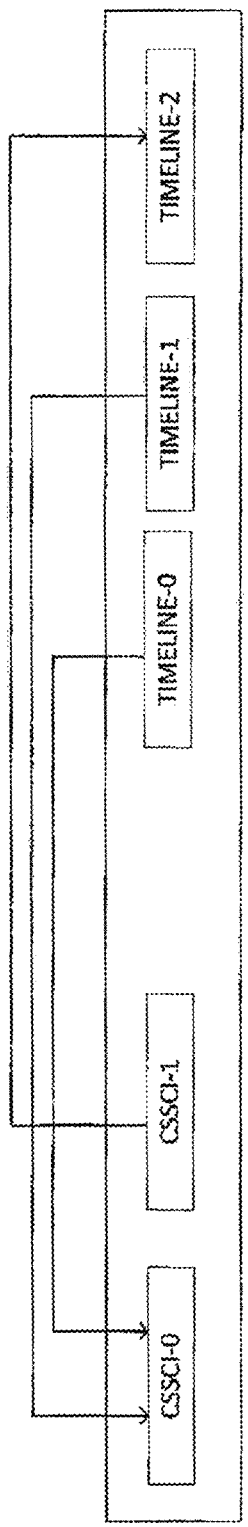
FIG. 8 illustrates relationships between watermark payloads.

Referring to FIG. 8, an exemplary time line is illustrated. A first CSSCI type payload (e.g., CSSCI-0) has a first set of association information P while a second CSSCI type payload (e.g., CSSCI-1) has a second different set of association information P. Having two different association information P for CSSCI-0 and CSSCI-1 distinguish between and identify the two CSSCI payloads. A first time location payload (e.g., Timeline-0) has the first set of association information P that matches the association information P for CSSCI-0, a second time location payload (e.g., Timeline-1) has the same first set of association information P that matches the association information P for CSSCI-0, a third time location payload (e.g., Timeline-2) has the same second set of association information P that matches the association information P for CSSCI-1. In this manner, CSSCI-0, Timeline-0; CSSCI-0, Timeline-1; and CSSCI-1, Timeline-2 are associated together as pairs having spanned watermarked information. This permits the same CSSCI type payload to be used for multiple different time location payloads. As illustrated, two of the temporal location payloads are associated with a previously received CSSCI type payload, and one of the CSSCI type payloads are associated with a subsequently received temporal location payload, and thus bidirectional in its association. In the event that a corresponding CSSCI type payload matching a temporal location payload is not available, then the system may be able to determine that a packet has been lost or otherwise the watermarking was not effective. Similarly, in the event that a corresponding timeline type payload matching a CSSCI payload is not available, then the system may be able to determine that a packet has been lost or otherwise the watermarking was not effective. The loss of watermarking data occurs with some frequency because the audio-video content tends to be modified by audio-video transcoding, such as to reduce the bitrate of the audio-video content.

In an example, a CSSCI type payload (e.g. CSSCI-0) has two sets of association information P0 and P1. A time location payload, e.g. Timeline-0, has two sets of association information P0 and P1 that matches the association information P0 and P1 for CSSCI-0. In this example a bidirectional association exists for the pair CSSCI-0, Timeline-0 where P0 points to CSSCI-0 and P1 points to Timeline-0.

The number of bits assigned to the payload identifier (P) may be modified, as desired (e.g., for a desired robustness). Similarly, the number of bits assigned to I, A, T, D, L, and R may be modified, as desired.

Figure 9:
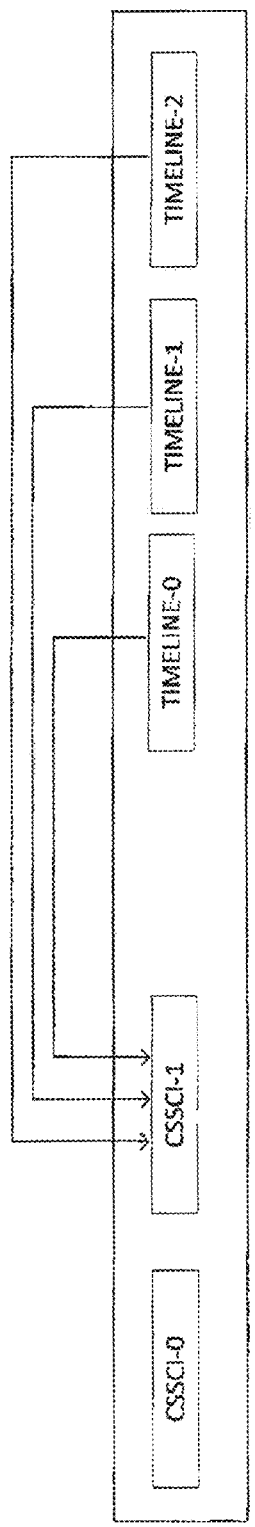
FIG. 9 illustrates relationships between watermark payloads.

In an example, the AV presentation device 180 may maintain a list, which may be denoted by a variable listC for example, of "c" most recently received CSSCI payload(s). "c" may be provided in the watermark, if desired, or otherwise set by the system. In this manner, the AV presentation device 180 may only have to maintain a limited number of CSSCI payloads in memory. In the case that c=1, then once a CSSCI payload is received it remains in effect until another CSSCI payload is received, as illustrated in FIG. 9. A loss of a CSSCI payload may be detected using the payload identifier (P); for example, the temporal location payload contains a P that does not correspond to any of the CSSCI payloads in listC. In this manner, the same user experience may be achieved across different AV presentation devices.

In an example, the AV presentation device 180 may maintain more than one list of received CSSCI payload(s). Each list may differ in size and may be maintained (i.e. addition or removal of entries within the list) using a differing set of rules. It is to be understood, that this does not preclude the possibility that a subset of lists may have same size and/or same maintenance rules. As an example, there may be two lists maintained by 180 where one list contains "c1" most recently received CSSCI payload(s) where each payload is received at an interval of "0" CSSCI payload(s); while the other list contains "c2" most recently received CSSCI payload(s), where each payload is received at an interval of "d" CSSCI payload(s).

Figure 10:
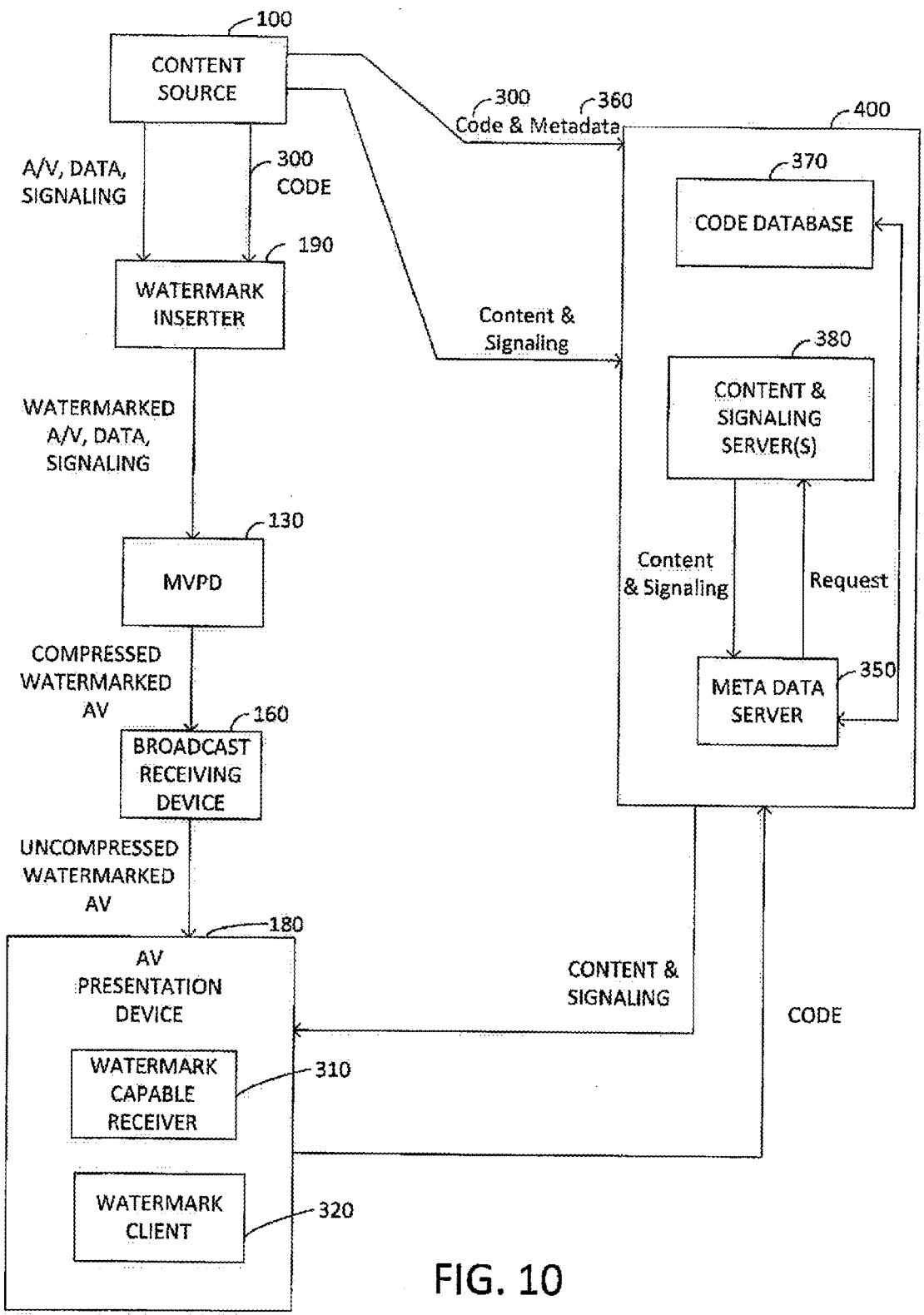
FIG. 10 illustrates another system with enhanced information.

Referring to FIG. 10, a modified system may include the content source 100, the watermark inserter 190, the MVPD 130, the broadcast receiving device 160, and the AV presentation device 180 together with its watermark capable receiver 310 and watermark client 320. The content server 400 may be modified to include the code database 370, the metadata server 350, and one or more of the content and signaling server 380. The code 300 and the metadata 360 is provided to the content server 400 by the content source 100. The content and signaling data is provided to the content and signaling server(s) 390.

The AV presentation device 180 may provide a code in a request based upon the decoded one or more watermarks from the audio-video broadcast. The content server 400 receives the request with the code from the AV presentation device 180. The metadata server 350 then parses the received code request and based upon information from the code database 370, makes a request to the content and signaling server(s) 390 to determine the content and signaling information which is then provided to the AV presentation device 180. In this manner, the AV presentation device 180 only needs to make a single request to a content server 400, which in turn provides the response to the AV presentation device 180. It is to be understood that the different functions of the content server 400 may be achieved by combining the existing functions together, separating the existing functions into more components, omitting components, and/or any other technique.

A HTTP or HTTPS request URL (that will be sent to the content server 400) corresponding to payload(s) in FIG. 5 and FIG. 6, when time sanative trigger D equals to 1, may be defined as:

If A is equal to 0 then the HTTP request URL is:
HTTP://IIIIIIII.IIIIIIII.IIIIIIII.IIIIIIII/LLLLLLLLL?time=T
TTTTTTTTTTTTTTTTTTTTTTTTT
Otherwise, the HTTPS request URL is:
HTTPS://IIIIIIII.IIIIIIII.IIIIIIII.IIIIIIII/LLLLLLLLL?time=
TTTTTTTTTTTTTTTTTTTTTTTTT
where IIIIIIII.IIIIIIII.IIIIIIII.IIIIIIII above corresponds to the 32-bit IP address signaled in CSSCI payload.

In an example, the subset of URL that specifies information such as: the content server location, the communication protocol, communication port, the login information, the folder on the content server are carried in a designated payload type.

In some implementations a syntax element's value may be derived using a decoding process which may access information spanning multiple payloads. For example, the time code may be fragmented into multiple watermark payloads and then reassembled to construct a complete time code. In an example, the time code may correspond to a temporal location within the AV content. In an example, the time code may correspond to timeline data of the AV content.

For example, the payload size may be 50 bits while the desirable metadata may be 66 bits, thus exceeding the payload size of a single watermark. An example of the desirable metadata may be as follows:

| | |
|---|---|
| location of content and server (I) | 32 bits (IP address) |
| application layer protocol (A) | 1 bit (HTTP or HTTPS) |
| time code (T) | 25 bits (for 1 year of uniqueness with a granularity of 1 second) |
| time sensitive trigger (D) | 1 bit |
| channel identification (L) | 5 bits |
| duration for content server requests (R) | 2 bits |

Another example of the desirable metadata may be as follows:

| | |
|---|---|
| location of content and server (I) | 32 bits (IP address) |
| application layer protocol (A) | 2 bit (00 = HTTP, 01 = HTTPS, 10 = reserved, 11 = reserved) |
| time code (T) | 25 bits (for 1 year of uniqueness with a granularity of 1 second) |
| time sensitive trigger (D) | 1 bit |
| channel identification (L) | 5 bits |
| duration for content server requests (R) | 2 bits |

Figures 11, 12:
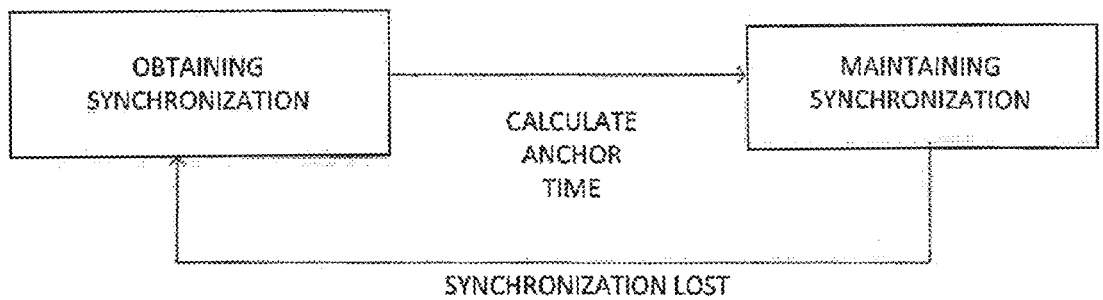
FIG. 11 illustrates obtaining synchronization and maintaining synchronization.
FIG. 12 illustrates another watermark payload.

Referring to FIG. 11, a state transition diagram illustrates one technique to calculate the time code. To obtain a time code synchronization a number of consecutive payloads starting with a payload type "start sync", is followed by payloads of type "not start sync", with a total being equal to "r". By using the total of "r" consecutive payloads, each having some time information contained therein, the time synchronization may be determined by calculating an anchor time. After calculating the anchor time code, the time code may be updated by receiving additional payloads that include partial time code information therein in such a manner that does not require receiving another total of "r" consecutive payloads to determine the next time code. One technique to achieve this time synchronization is to partition the time code in consecutive payloads and an incremental time code in each of the consecutive payloads. When the synchronization is lost, such as by changing the channel, the obtain synchronization process is performed. A video display device when first initialized, or turned on, enters the initial obtaining synchronization state.

Referring to FIG. 12, an exemplary structure of a watermark payload is illustrated. Z indicates the payload type, where Z equal to 1 indicates the start of the time sync and Z equal to 0 indicates not start of time sync. S indicates the time sync payload bits used in determining absolute time code. M indicates the time sync payloads bits used in maintaining the time code.

By way of example, the AV presentation device 180 may receive n=7 consecutive watermark payloads where the first payload has Z=1 while the rest have Z=0. The bits corresponding to "SSSS" are extracted from $(t-n+1)^{th}$ to $t^{th}$ watermark payload and concatenated together to obtain a 28 bit representation of the time code "$T_t$" of a temporal location. The anchor time code "$C_t$" is also set to "$T_t$". "$T_t$" may be represented as $SSSS_{z=1,t-n+1} \ldots SSSS_{z=0,t-1}$ $SSSS_{z=0,t}$; "$C_t$"="$T_t$". In another example, constants may be added (to select a future time) and/or multiplied (to change the granularity) to the derived values. In an example, the derived values are mapped to another value by use of a mapping function.

Once the initialization synchronization is obtained, the anchor time and payload time are updated using each payload. This may be performed, for example, as follows:

$$T_t = f(C_{t-1}, MMMM_t)$$

$$C_t = g(T_t)$$

Where, f represents a mapping function that takes two values as input and outputs one value; g represents a mapping function that takes one value as input and outputs one value; / represents integer division with truncation of the result toward zero, For example, 7/4 and −7/−4 are truncated to 1 and −7/4 and 7/−4 are truncated to −1. In an example:

$$T_t = C_{t-1} + MMMM_t$$

$$C_t = T_t$$

As described above, every "n" payloads the anchor time may also be determined using the bits corresponding to "SSSS". The anchor time determined using "SSSS" may match the anchor time derivation above and can be used to verify the correctness of the maintained time code.

Since the watermark may span a non-zero time, the temporal location of the time code $T_t$ may be determined by a set of rules, such as for example, $T_t$ may correspond to a time instant at the end of the $t^{th}$ watermark payload.

It is to be understood that multiple syntax elements may be combined to form the code. The code may then be mapped either by the AV presentation device 180 or using another server to different syntax element values. For example, the server information (e.g., location of the content and signaling server(s) and/or application layer protocol, etc.) and time code is combined into a single code. The single code is then mapped to a temporal location in the uncompressed audio-video stream, and location of the content and signaling server(s). In this manner, a single request may be made to the server for additional information.

A limited number of bits may be used for the time code, in such a manner to permits collisions in the time code. For example, using 20 bits for the timecode allows for at most 12 days of uniqueness at a granularity of 1 second. After 12 days the code space corresponding to the timecode will be reused tending to result in collisions.

In an example the watermark payload may be encapsulated within a SDO private data command as SDO payload using one or more cmdIDs. As an example the watermark payload of FIG. 5 or FIG. 6 maybe encapsulated as SDO payload. A cmdID value 0x05 may refer to a watermark based interactive services trigger or a triggered declarative object (TDO) model. A cmdID value 0x06 may refer to a watermark based interactive services trigger (direct execution model). This facilitates the re-use of existing segmentation and reassembly modules built for trigger transportation. The segmented command may be embedded in watermarks, if desired. The SDO private data may be desired, such as illustrated in FIG. 13, where the packet is included as part of an SDO_payload( ). In some examples, the watermark payload received in this manner maybe passed to an entity or module in the receiver which handles these defined cmdID types. Then segmentation and reassembly functionality of that module could be reused if watermark payload packet needs to be split into multiple packets—depending upon the selected watermark scheme's capacity in terms of number of bits.

Parameter type T is a 2-bit field that indicates whether the instance of SDO private data, or SDOPrivateData, command is part of a segmented variable length command, and if so, whether the instance is the first, middle, or last segment of the segmented variable length command. In one example, SDOPrivateData is defined by the Consumer Electronics Association (CEA) in Section 7.1.11.2 of "CEA: "Digital Television (DTV) Closed Captioning, CEA-708-E, Consumer Electronics Association, June 2013" (CEA-708), and the type field in the SDO private data command is encoded as specified in Section 7.1.11.2 of CEA-708. pr is a flag that indicates, when set to '1', that the content of the command is asserted to be program related. When the flag is set to '0', the content of the command is not so asserted. Length (L) is an unsigned integer that indicates the number of bytes following the header, in the range of 2 to 27, and is represented in the SDO private data command as the set of bits $L_4$ through $L_0$ where $L_4$ is the most significant and $L_0$ is the least significant. cmdID is a signal that identifies the SDO that has defined the syntax and semantics of the SDO_payload( ) data structure to follow. In an example, cmdID is an 8-bit field. The metadata may be encapsulated within SDO private data as SDO payload using one or more cmdIDs as shown in FIG. 14.

The payload defined in FIG. 5 and FIG. 6 may be encapsulated within a SDO private data command as SDO payload using one or more cmdIDs. A cmdID value 0x05 and 0x06 may refer to encapsulation of payloads defined in FIG. 5 and FIG. 6 respectively. This facilitates the re-use of existing segmentation and reassembly modules built for trigger transportation. The segmented command may be embedded in watermarks, if desired. The SDO private data may be desired, such as illustrated in FIG. 13, where the payload packet is included as part of SDO_payload( ).

The payload defined in FIG. 12 may be encapsulated within a SDO private data command as SDO payload using one or more cmdODs. A cmdID value 0x05 may refer to encapsulation of payload defined in FIG. 12. This facilitates the re-use of existing segmentation and reassembly modules built for trigger transportation. The segmented command may be embedded in watermarks, if desired. The SDO private data may be desired, such as illustrated in FIG. 13, where the packet is included as part of SDO_payload( ).

An example of a watermark associated information retrieval system is described next.

The system consists of a watermark detector, an AV presentation device, a watermark information server. In one example, the watermark detector may reside inside an AV presentation device. In one example, the AV presentation device may be a AV presentation device 180. In one example, the watermark information server may be an enhanced service information providing server 140.

In one example, the watermark detector may detect and decode the watermark. The watermark may be an audio watermark. The watermark detector and/or AV presentation device may use the information in the watermark to identify a timeline location of the media content in which the watermark is embedded and/or an address (e.g. IP address) of a server that can be concatenated to obtain further information associated with the watermark. In an example, this may be necessary as the watermark payload capacity may be only a few bits. For example the capacity may be 50 bits over a time period of 1 second or 1.5 seconds or 2 seconds. In this case the AV presentation device may contact a watermark information server to obtain more information about the current timeline location for the current media.

The watermark server may send "watermark associated information" as a response to this request.

JavaScript Object Notation (JSON) is a data interchange format.

JSON schema defines a JSON based format for defining the structure of JSON data. JSON schema is intended to define validation, documentation, hyperlink navigation, and interaction control of JSON data.

An object is an unordered collection of zero or more name and value pairs, where a name is a string and a value is a string, number, Boolean, null, object, or array.

A JSON schema is a JSON document, which may be an object. Object properties defined by JSON schema are called keywords or schema keywords.

A JSON schema may contain properties which are not schema keywords.

A JSON value may be an object, array, number, string, or one of false, null, or true.

The terms element and key and keyword and name may be used interchangeably in this document. The term key may be used to refer the name of an object in this document.

The terms recovery file format and recovery data table may be used interchangeably in this document.

FIG. 15 shows an exemplary JSON schema for watermark associated information. With respect to FIG. 15 the following should be noted.

Instead of using XML to represent the watermark associated information retrieved, JSON may be used. In this case instead of using elements (e.g. XML elements) and attributes (XML attributes), JSON objects are used with their properties.

Entertainment identifier register (EIDR) is a universal identifier system for movie and television assets. From top level titles, edits, and DVDs, to encodings, clips and mash-ups, EIDR provides global identifiers for the entire range of audiovisual object types that are relevant to entertainment commerce. EIDR format described at HTTP://eidr.org/documents/EIDR_ID_Format_v1.2.pdf and is incorporated herein by reference. Subsequent versions of EIDR identifier format may be used.

Advertising identifier (AD-ID), which may also be referred to as Ad-ID, is an industry standard for identifying advertising assets across media platforms. Ad-ID code structure as shown in HTTP://www.Ad-ID.org/how-it-works/Ad-ID-structure and is incorporated herein by reference.

With respect to FIG. 15 a regular expression based syntax is defined in JSON schema for EIDR and Ad-ID information inclusion in the ContentID event. In contrast to using a string, this formal syntax enforces that only valid values could be signaled for EIDR and Ad-ID.

This is illustrated in the extracted part of the JSON schema from FIG. 15 below:

```
"ContentID": {
    "type": "object",
        "properties": {
            "oneOf": [ {"Type": {"type": "string", "enum": ["EIDR"]},
                "CID": {"type": "string", "pattern": "^10\\.5240\\/([0-9a-fA-F]{4}-){5}[0-9A-Z]$", "minLength": 34, "maxLength": 34}},
                    {"Type": {"type": "string", "enum": ["AD-ID"]},
                    "CID": {"type": "string", "pattern": "^[1-9a-zA-Z]{1}[0-9a-zA-Z]{10}(H|D)?$", "minLength": 11, "maxLength": 12}}
            ]
        }
},
```

In this schema with the use of regular expression based "pattern", the string included as a value for the content identifier value (CID), or ContentID, key for an EIDR type is by design always a valid EIDR string. In this schema with the use of regular expression based pattern the string included for the CID key for an AD-ID type is by design always a valid Ad-ID string. As a result invalid EIDR and Ad-ID strings cannot be sent from the watermark server in the JSON data.

Further with respect to FIG. 15, an enumerated data type is defined for the ContentID type instead of a general purpose string. This restricts the value to only valid values. As a result it is not possible to define an invalid value for ContentID type. This can be seen in the use of "enum": ["EIDR"] and "enum": ["AD-ID"] values defined for the respective Type (or type) strings inside the ContentID object in the schema in FIG. 15. As a result invalid ContentID type values could be defined and returned.

Further with respect to FIG. 15, an extension mechanism is defined for trigger events represented by a trigger key in FIG. 15 to return one or more of a universal resource indicator (URI) event type other than a currently defined URI types in the future. The extended URI types are defined with a designated prefix. This is illustrated in the extracted part of the JSON schema from FIG. 15 below. In an example, the JSON schema includes an application information table (AIT), a media presentation description (MPD), and/or an electronic service guide (ESG) value.

```
"Trigger": {
    "type": "object",
    "properties": {
        "Trigger": {"type": "string", "format": "uri"},
        "Version": {"type": "integer"},
        "UriType": {"type": "string",
            "oneOf": [ {"enum": ["AIT", "MPD","ESG"]},
                {"pattern": "^EXT"}
            ]},
        "required": ["Trigger","UriType"]
    }
},
```

It can be seen that trigger types, such as AIT, MPD, and ESG, are defined as valid string values. This is represented by the "enum": ["AIT", "MPD", "ESG"] for the UriType string. In the future other valid trigger types may be defined. This is accomplished by allowing use of other string values for UriType. In an example, these strings may start with a prefix of EXT. This behavior is defined by the use of "oneOf" constraint for the UriType string as follows:

```
"UriType": {"type": "string",
    "oneOf": [ {"enum":["AIT", "MPD","ESG"]},
        {"pattern": "^EXT"}
    ]},
```

The defined prefix above is denoted as EXT, which means that an extension UriType may start with the characters EXT. Other characters could instead be used. For example instead of EXT, the strings FUT, NEXT or any other suitable string may be used.

In an example, a future UriType may be allowed to be any valid string in which case the relevant part of the schema may be defined as:

```
"UriType": {"type": "string",
    "oneOf": [ {"enum": ["AIT", "MPD","ESG"]},
        {"pattern": ".+"}
    ]},
```

In another example, additional overall extensions of the schema shown in FIG. 15 and FIGS. 16A-C are supported for future extensibility. In another example, to allow future extensibility the JSON schema may be defined with key, value pair of additionalProperties: true.

For example the last 4 lines of the JSON schema of may be replaced with following:

```
        "required": ["TimeAnchor","IntervalCodeAnchor","Event"],
        "additionalProperties": true
    }
}
```

This allows defining additional objects and types with properties inside the returned JSON data.

Figure 16A:
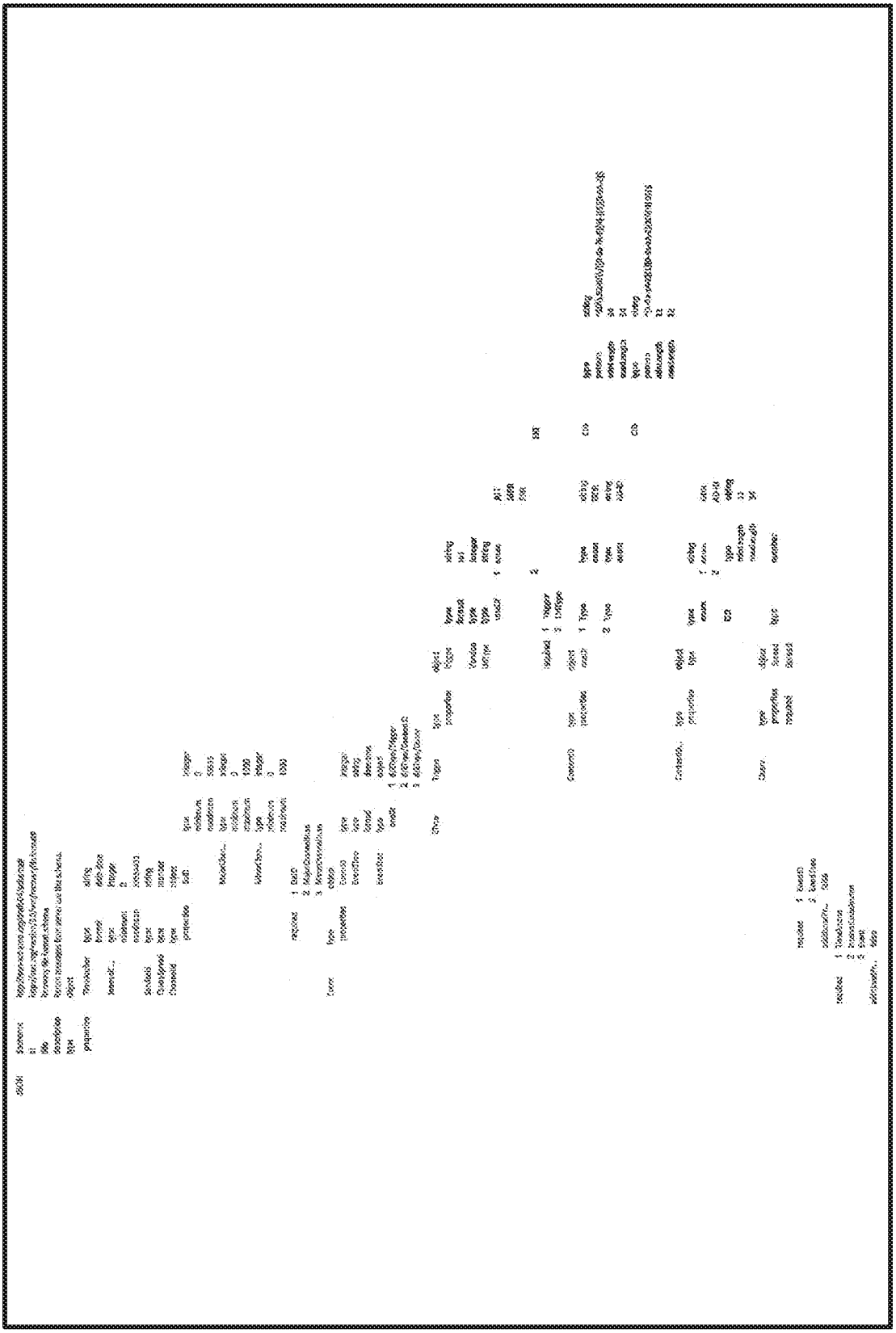
FIG. 16A illustrates logical structure of a JavaScript Object Notation schema.
Figure 16B:
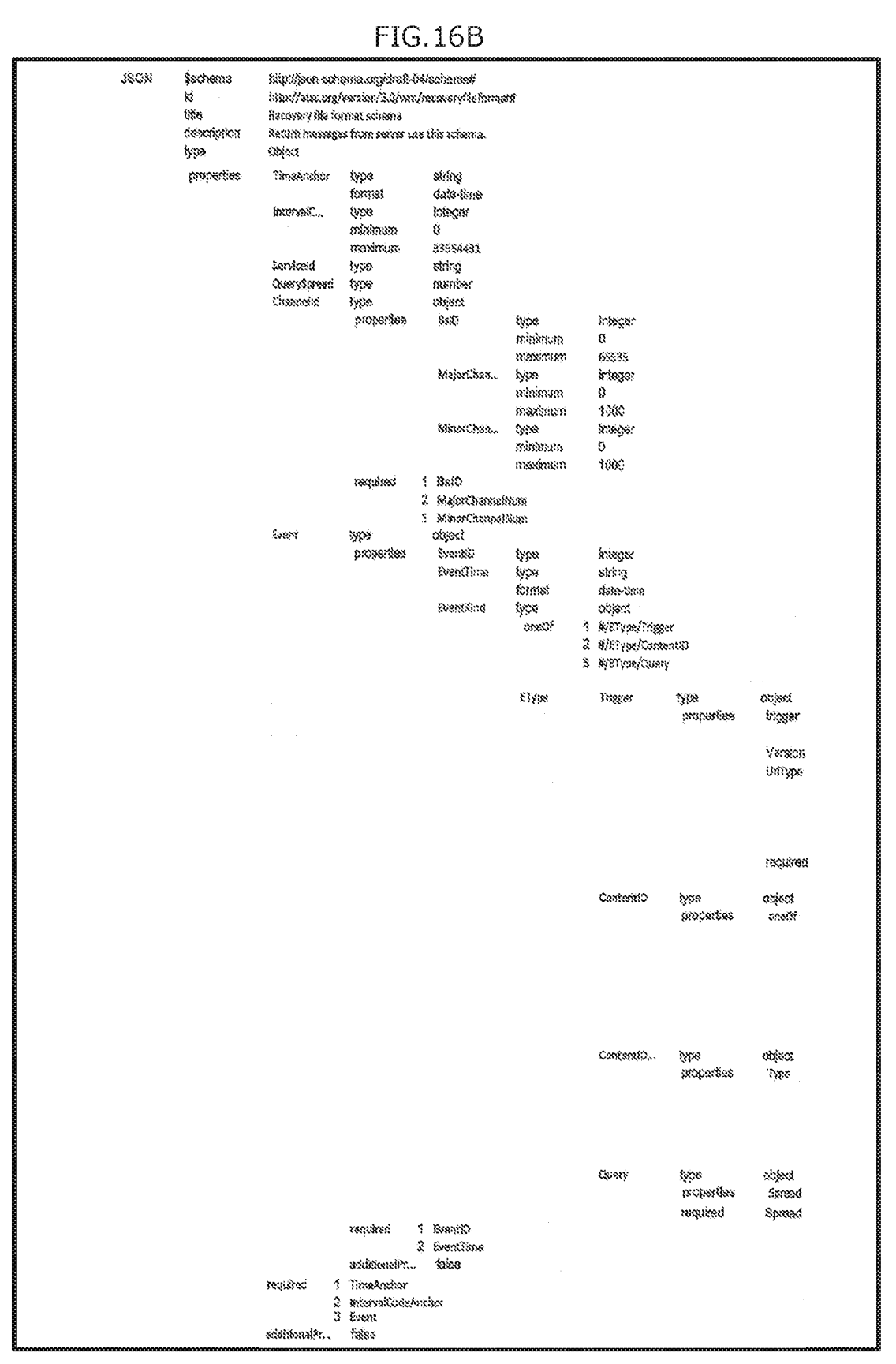
Figure 16C:
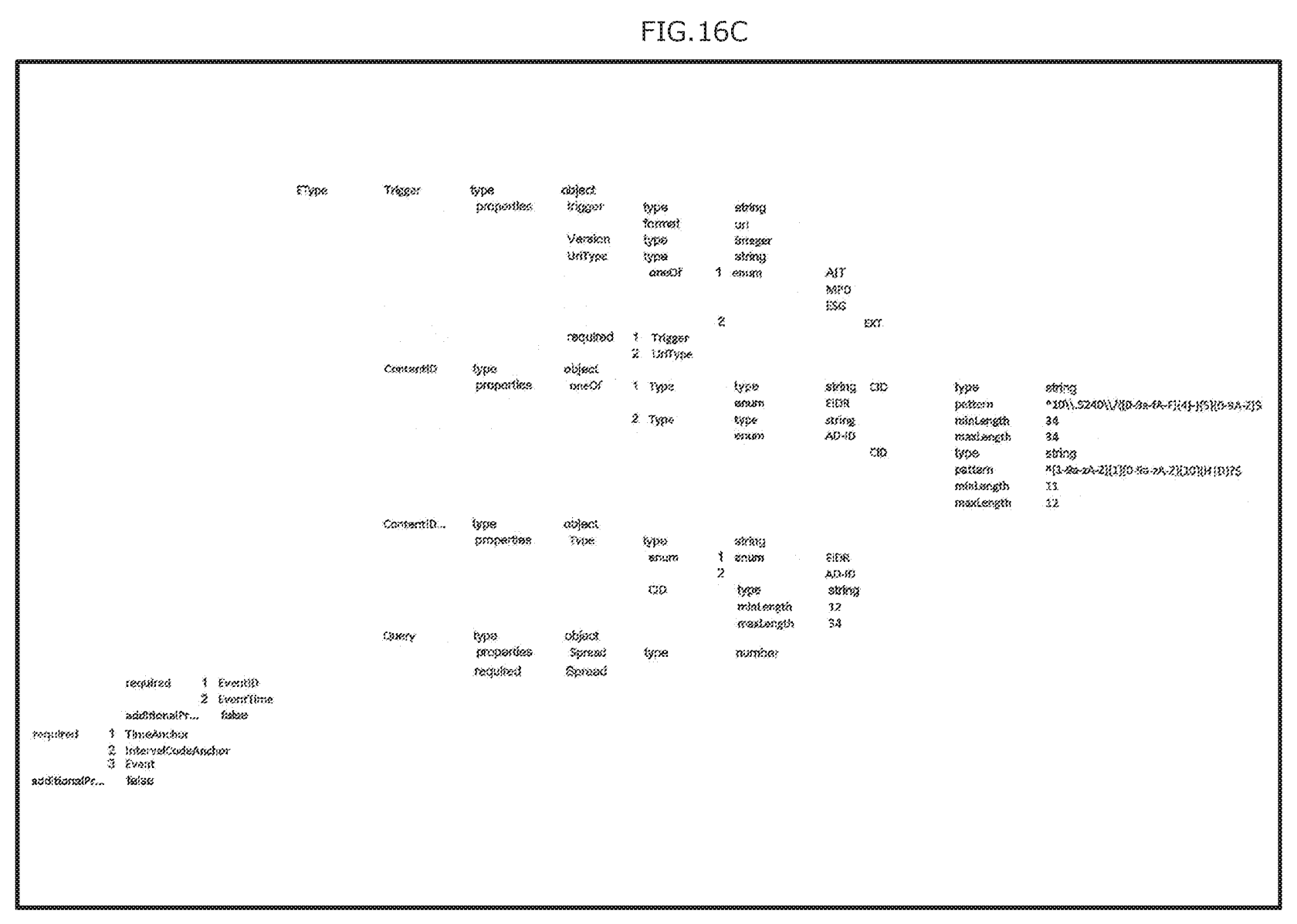

FIG. 16A illustrates logical structure of a JavaScript Object Notation schema. FIG. 16B illustrates the left half part of FIG. 16A. FIG. 16C illustrates the lower half part of FIG. 16A. The FIGS. 16A-C structure corresponds to FIG. 15 JSON schema. However some or part of the logical structure may be manifested with variant JSON schema.

In an example, the watermark associated information returned via JSON schema illustrated in FIG. 15 and/or FIGS. 16A-C from a watermark server may be a recovery file format.

In another example, instead of using JSON to represent the watermark associated information returned from the watermark server XML format may be used for it. A few enhancements and ways of returning XML format data from watermark server and conformance with defined XML schema is described next.

In an example, a pattern based syntax using XML is defined for one or more of a EIDR and an Ad-Id information inclusion in the ContentID event. In contrast to using a general purpose xs:String data type, this formal syntax enforces that only valid values could be signaled for EIDR and AD-ID.

In an example, the XML schema for EIDR information inclusion is:

```
<xs:simpleType name="CID">
    <xs:restriction base="xs:token">
        <xs:pattern value="(10\.5240/([0-9a-fA-F]{4}-){5}[0-9A-Z])"/>
    </xs:restriction>
</xs:simpleType>
```

In an example, the XML schema for Ad-ID information inclusion is:

```
<xs:simpleType name="CID">
    <xs:restriction base="xs:token">
        <xs:pattern value="([1-9a-zA-Z]{1}[0-9a-zA-Z]{10}(H|D)?)"/>
    </xs:restriction>
</xs:simpleType>
```

A combined XML schema for EIDR or Ad-ID inclusion is as shown below:

```
<xs:simpleType name="CID">
    <xs:restriction base="xs:token">
        <xs:pattern value="([1-9a-zA-Z]{1}[0-9a-zA-Z]{10}(H|D)?)|(10\.5240/([0-9a-fA-F]{4}-){5}[0-9A-Z])"/>
    </xs:restriction>
</xs:simpleType>
```

In another example, an enumerated data type is defined for the type of ContentID, or ContentIDType, instead of a general purpose string. This restricts the value to only valid values.

In an example, the XML schema for this is:

```
<xs:simpleType name="ContentIDType">
    <xs:restriction base="xs:string">
        <xs:enumeration value="EIDR" />
        <xs:enumeration value="Ad-ID" />
        <xs:enumeration value="EXT" />
    </xs:restriction>
</xs:simpleType>
```

The overall XML schema for ContentID event with inclusion of constrained type and contentID attributes is as shown below:

```
<xs:element name="ContentID">
    <xs:complexType>
        <xs:attribute name="type" type="ContentIDType"/>
        <xs:attribute name="contentID" type="CID"/>
    </xs:complexType>
</xs:element>
```

Another example of using XML schema is described next.

The above XML schema definitions allows defining a ContentID event with type equal to Ad-ID but the ContentID value defined for EIDR identifier.

Similarly the above XML schema definitions allow defining a ContentID event with type equal to EIDR but the ContentID value defined for Ad-ID identifier.

To prevent this definition, the XML schema may be defined as follows.

```
<xs:simpleType name="ContentIDType1">
    <xs:restriction base="xs:string">
        <xs:enumeration value="EIDR" />
    </xs:restriction>
</xs:simpleType>
<xs:simpleType name="ContentIDType2">
    <xs:restriction base="xs:string">
        <xs:enumeration value="Ad-ID" />
    </xs:restriction>
</xs:simpleType>
<xs:simpleType name="CIDToken1">
    <xs:restriction base="xs:token">
        <xs:pattern value="10\.5240/([0-9a-fA-F]{4}-){5}[0-9A-Z]"/>
    </xs:restriction>
</xs:simpleType>
<xs:simpleType name="CIDToken2">
    <xs:restriction base="xs:token">
        <xs:pattern value="[1-9a-zA-Z]{1}[0-9a-zA-Z]{10}(H|D)?"/>
    </xs:restriction>
</xs:simpleType>
        <xs:element name="ContentID">
            <xs:complexType>
                <xs:choice>
                <xs:sequence>
                <xs:element name="CID1">
                    <xs:complexType>
                        <xs:attribute      name="type" type="ContentIDType1"/>
                        <xs:attribute  name="contentID" type="CIDToken1"/>
                    </xs:complexType>
                </xs:element>
                </xs:sequence>
                <xs:sequence>
                <xs:element name="CID2">
                    <xs:complexType>
                        <xs:attribute      name="type" type="ContentIDType2"/>
                        <xs:attribute name="contentID" type="CIDToken2"/>
                    </xs:complexType>
                </xs:element>
                </xs:sequence>
                </xs:choice>
            </xs:complexType>
        </xs:element>
```

This XML schema strictly enforces that ContentID value can only be a valid Ad-ID identifier value when ContentID event has type equal to Ad-ID. Also the XML schema enforces that ContentID value can only be a valid EIDR identifier value when ContentID event has type equal to EIDR.

Cardinality of query spread attribute is modified from 0 . . . N to 0 . . . 1. Signaling multiple query spread values can result in confusing receiver behavior thus at most only 1 value of query spread is signaled.

In an example, the XML schema for this is:

```
<xs:element name="RecoveryData">
    <xs:complexType>
        <xs:attribute name="querySpread" type="xs:string" use="optional"/>
    </xs:complexType>
</xs:element>
```

An extension element is defined for future extensions. A RecoveryExt element of the type "RecoveryExtType" is defined to allow defining proprietary extensions of the watermark associated information.

In an example, the following XML schema may be defined for this.

The extension element may be defined as a child element of the overall root element or at any other suitable place in the overall XML schema as follows:

```
<xs:element              name="RecoveryExt"
    type="RecoveryExtType" minOccurs="0"/>
```

In an example, the XML data type for the extension element RecoveryExtType is:

```
<xs:complexType name="RecoveryExtType">
    <xs:sequence>
        <xs:annotation>
            <xs:documentation>
                Proprietary extensions of recovery file
format. It is a requirement that different namespace may be used for proprietary extensions.
```

```
            </xs:documentation>
        </xs:annotation>
        <xs:any          namespace="##other"
    processContents="skip" minOccurs="0" maxOccurs="unbounded"/>
        </xs:sequence>
</xs:complexType>
```

Additional examples are now described for JSON schema to make the schema extensible.

An additional JSON schema for watermark associated information retrieval is shown in FIG. 17. In the schema support is included for extensibility of JSON schema for extensibility.

In the JSON schema in FIG. 17 compared to JSON schema in FIG. 15, the following is included for extensibility:

(1) A top level key, such as RecoveryFF is defined and the current recovery file format schema in FIG. 17 is defined as an object for this top level key. Thus, the schema in FIG. 15 may be wrapped inside the top level key. This allows extensibility for the current recovery file format by use of "allOf" and "$ref" keywords of a JSON schema.

The JSON keyword "allOf" is defined in HTTP://tools.ietf.org/html/draft-fge-json-Schema-validation-00 which is incorporated here by reference. In an example, "allOf" defines that the given data may be valid against all schema defined by a keyword value. In an example, to validate against "allOf", the given data may be valid against all schemas defined by this keyword's value.

Part of a schema may be referred to using the $ref keyword. $ref gets logically replaced with the schema part that it points to.

(2) Keys are made unique. Thus none of the keys, even if they belong to different objects, have the same key name. This facilitates extensibility.

One example of doing an extension is when a second version of a recovery file format is defined. In this case the new key and value pairs may be added to a schema, while keeping the old key value pairs for backward compatibility with the schema in FIG. 17.

When extending the JSON schema in FIG. 17, the following type of new key may be defined:

```
"RecoveryFFV2": {
  "type": "object",
  "properties": {
    "V2": {"allOf": [
      {"$ref": "#/RecoveryFF"},
      {
        "properties": {
          "newkeyA": "valueA",
          "newkeyB": "valueB"
        },
        "required": ["newkeyA"]
      }
    ]}
  }
}
```

In an example, the new key is the "RecoveryFFV2" key.

In this case with the use of allOf keyword the data may be valid against all of the given schemas.

The first schema included inside allOf keyword is {"$ref": "#/RecoveryFF"}, which refers to the schema for first version of recovery file format as shown in FIG. 17. The new keys and values for schema for the second version of recovery file format are then included as:

```
{
  "properties": {
    "newkeyA": "valueA",
    "newkeyB": "valueB"
  },
  "required": ["newkeyA"]
}
```

Figure 18:
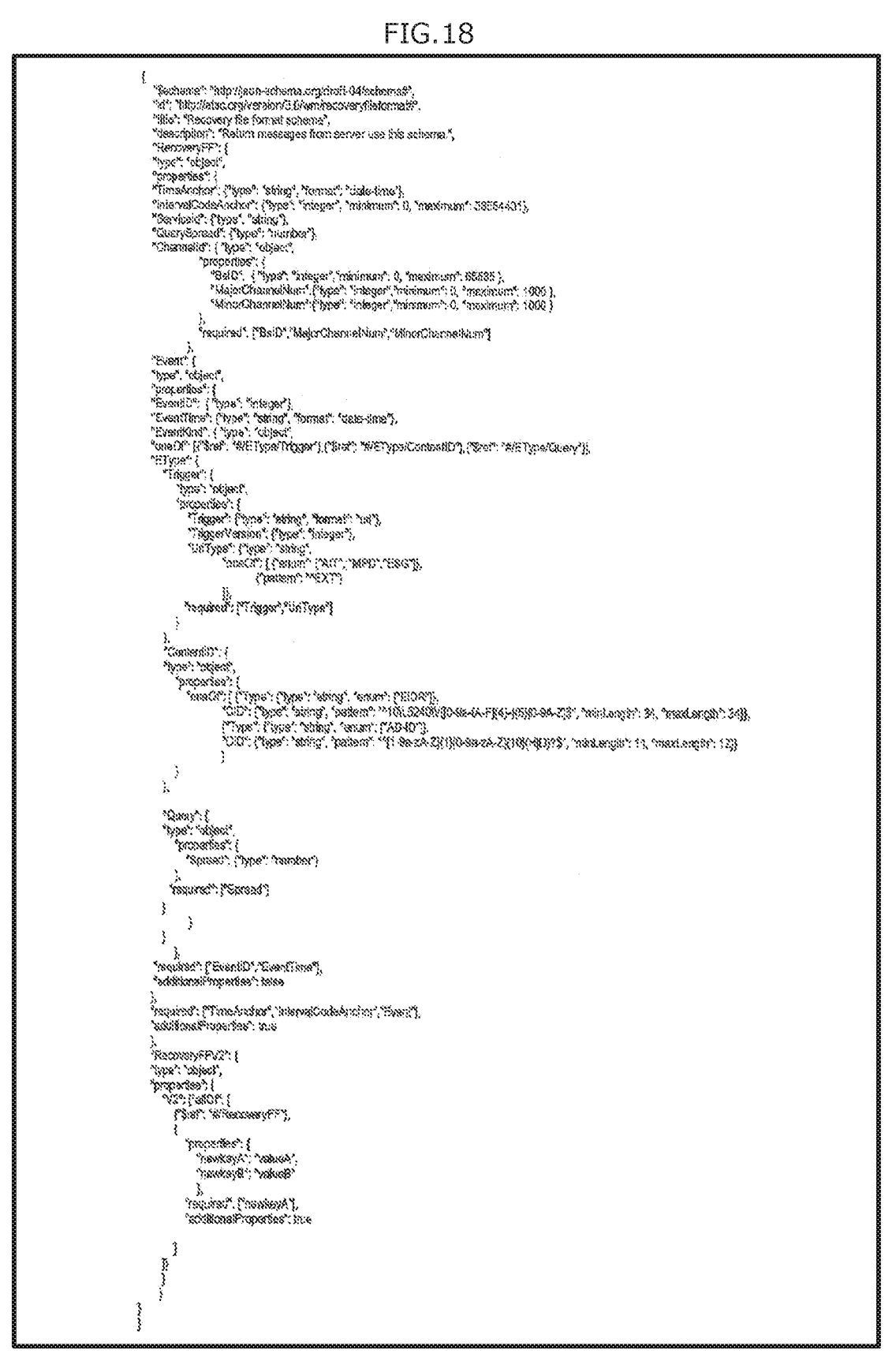

Thus the overall example schema for second version of recovery file format is as shown in FIG. 18.

A second example for providing an extensible schema is illustrated below. In this example, a JSON for Linked Data (JSON-LD) based extension mechanism is defined by inclusion of a @context keyword. JSON-LD is a format to serialize linked data. The JSON-LD syntax is designed to integrate into systems that already use JSON and provides an upgrade path from JSON to JSON-LD. JSON-LD is primarily intended to be a way to use linked data in web-based programming environments, to build interoperable web services, and to store linked data in JSON based storage engines. Linked data is a way to create a network of standards-based machine interpretable data across different documents and web sites. It allows an application to start at one piece of linked data and follow embedded links to other pieces of linked data that are hosted on different sites.

FIG. 19 shows an example of a JSON schema for a watermark associated information retrieval.

In the JSON schema in FIG. 19, compared to the JSON schema in FIG. 15, the following is added for extensibility:

(1) A key (@context) is defined and the current recovery file format schema in FIG. 19 is included as "RecoveryFF": HTTP://www.atsc.org/contexts/3.0/RecoveryFF inside the key (@context). The schema is then wrapped inside the key "RecoveryFF".

(2) Keys are made unique, in that keys do not have the same key name, even if they below to different objects. This facilitates extensibility.

One example of enabling an extension is defining a second version of the recovery file format. In this example, the new key and value pairs will be added to a schema, while keeping the old key value pairs for backward compatibility with the schema in FIG. 19.

When enabling an extension of the JSON schema in FIG. 19, a @context can be included for the new keys and values as:

```
"@context":
{
  "RecoveryFF2": "HTTP://www.atsc.org/contexts/3.1/RecoveryFF"
},
"RecoveryFF2": {
  "type": "object",
  "properties": {
    "newkeyA": "valueA",
    "newkeyB": "valueB"
  },
  "required": ["newkeyA"]
}
```

The new key in this case is "RecoveryFF2".

The new "@context" for the new key "RecoveryFF2" is "RecoveryFF2": "HTTP://www.atsc.org/contexts/3.1/RecoveryFF"

In an example, the new keys and values for the schema for the second version of recovery file format are then:

```
"RecoveryFF2": {
    "type": "object",
    "properties": {
        "newkeyA": "valueA",
        "newkeyB": "valueB"
    },
    "required": ["newkeyA"]
}
```

The overall example schema for second version of recovery file format is shown in FIG. 20.

In an example, when doing an extension a second version of recovery file format is defined, only one new @context may be included for old and new keys and values as follows.

```
"@context":
{
    "RecoveryFF": "HTTP://www.atsc.org/contexts/3.1/RecoveryFF"
},
```

In this example, the new keys and values for this second version of recovery file format are:
"newkeyA": "valueA",
"newkeyB": "valueB",
which may be included with other keys and values in the previous version of the schema in FIG. 19.

Thus, in this example, by changing the value of the "RecoveryFF" key inside "@context", the new and old keys and values may be included together as shown in FIG. 21.

Thus the overall schema for a recovery file format is as shown in FIG. 21.

Alternative examples are now provided for recovery file format structure.

An alternative logical structure of recovery file format table is shown in FIG. 22. The logical structure of Component Description is shown in FIG. 23. Three different logical structures of Component Anchor are shown in FIG. 24A, FIG. 24B, and FIG. 24C. With respect to FIG. 22 semantics of various elements are as described below.

ThisComponent—A description of the media component embedded with a watermark.

serverCode—When present, this element may provide the serverCode value which was employed in the HTTP request to which this recovery file was provided as a response.

intervalCode—When present, this element may provide the intervalCode value from the query request to which the recovery data table was provided as a response.

ComponentDescription—A data element describing ThisComponent in the format defined in FIG. 23.

querySpread—When present, this element may express the maximum duration that the receiver is recommended to delay submission of a HTTP request.

OtherComponent—An element describing another watermarked media component associated with the same service as ThisComponent in the format defined in FIG. 23.

ContentID—This field may identify a content identifier.

Instead of using a ContentID List container object, an array of ContentID objects is defined with effective cardinality of 0 . . . N instead of 1 . . . N (i.e., 0 to N entries in the array). This allows easier parsing of JSON data and simplifies overall data structure by not requiring a container object, which adds more parsing complexity, while still maintaining the desired flexibility.

ContentID.type—A field that is preferably required when ContentId element is included. Two values are may be defined:

"EIDR" indicates a content identification per the EIDR registry.

"Ad-ID" indicates a content identifier per the Ad-ID registry.

ContentID.cid—A field that is used when ContentId element is included that provides the content identification. The type of content identifier may be as given in the ContentID.type attribute. Either an EIDR (34-character canonical form with hyphens) or Ad-ID (11 or 12-character canonical form) can be included.

ContentID.validFrom—A field that provides information about when the ContentId is valid from.

ContentID.validUntil—A field that provides information about up to when the ContentId is valid until.

SourceID—An element describing a distribution source that employs ATSC emission specifications. This element is applicable to circumstances where the watermarked content is included in the redistribution of a service that is broadcast in accordance with ATSC emission specifications.

country—Country code associated with the primary administrative entity under which the value provided in bsid is assigned, using the applicable alpha-2 country code format as defined in ISO 3166-1. ISO 3166-1 available at http://webstore.ansi.org/RecordDetail.aspx?sku=ISO %203166-1:2013 is incorporated here by reference. bsid—The Broadcast service identifier (BSID) of the ATSC distribution source.

majorChannelNo—The major channel number assigned to the ATSC distribution source. This value is scoped to the BSID.

minorChannelNo—The minor channel number assigned to the ATSC distribution source. This value is scoped to the BSID.

Service—This element describes the service, its signaling formats and broadband locations.

serviceId—16-bit integer that may uniquely identify this Service within the scope of this Broadcast area.

sltSvcSeqNum—This integer number may indicate the sequence number of the service information with service identifier equal to the serviceId attribute above. sltSvcSeqNum value may start at 0 for each service and may be incremented by 1 every time any attribute or child of this Service element is changed. If no attribute or child element values are changed compared to the previous Service element with a particular value of serviceID then sltSvcSeqNum may not be incremented. The sltSvcSeqNum field may wrap back to 0 after reaching the maximum value.

slsProtocol—specifies the signaling format associated with this service.

slsMajorProtcolVersion—Major version number for the signaling protocol specified in slsProtocol.

slsMinorProtocolVersion—Minor version number for the signaling protocol specified in slsProtocol.

svcInetUrl—Provides information about URL to access ESG or service level signaling files for this service via broadband, if available.

URLtype—Type of files available with svcInetUrl.

URLValue—URL to access Internet signaling files for this service identified by serviceidentifier serviceId.

The URL value property (URLValue) is defined for indicating service internet URL value inside a contained object which encompasses the service Internet URL related properties. URLtype may be a required property (instead of optional property) for service Internet URL because otherwise it will not be known what type of URL is signaled.

With respect to FIG. 23 semantics of various elements are as described below.

ComponentDescription—Provides a description of a watermarked media component associated with a service.

ComponentAnchor—Information about the first payload in the watermarked media component as defined in either FIG. 24A or FIG. 24B or FIG. 24C.

With respect to recovery file format logical structure, in an alternative example a parent element ATSCSourceID and additionally a choice selection may be used inside the container SourceID element. This may allow defining source identifier other than ATSC in future. This part of the recovery file format logical structure may be as shown below.

```
SourceID            . . . 1
   Choice
      ATSCSourceID
         country          tring     ISO 3166-1 alpha-2 country
                                    code associated with the primary administrative
                                    entity under which the given bsid is assigned.
         bsid             nteger    Identifier of the whole
                                    Broadcast Stream. The value of BSID may be
                                    unique on a regional level (for example, North
                                    America). An administrative or regulatory
                                    authority may play a role.
         major            nteger    An integer number in the
         ChannelNo                  range 1 to 1000 representing the "major"
                                    channel number of the service.
         minor            nteger    An integer number in the range 1 to 1000
         ChannelNo                  representing the "minor" channel number of the
                                    service.
``` mediaType—A string with value "audio" to indicate that the description applies to an audio component only, "video" to indicate that the description applies to a video component only, or "both" to indicate that the description applies to both an audio and video component.

descriptor—An arbitrary descriptive string associated with the watermarked media component intended for consumption by an application.

priority—A numeric value indicating the relative priority of the described component. When no priority value is indicated for a component, its priority may be 0.

With respect to FIG. 24A semantics of various elements are as described below.

ComponentAnchor—An element that specifies characteristics of the first payload in a video or audio watermark segment.

intervalCodeAnchor—The intervalCode in the first payload in a video or audio watermark segment.

PresentationTime—The wall clock presentation time of the first frame of the first message block in the video watermark segment, or, for audio components, the wall clock presentation time of the first sample of the first symbol in the first cell of the audio watermark segment.

JSON schema for recovery file format with logical structure shown in FIG. 22, FIG. 23, FIG. 24A is shown below as FIG. 25A-D.

With respect to JSON schema, in an alternative example the presentationTime may be signaled with a data type other than the type "string". For example type "number" may be used.

In this case with respect to FIG. 24 the corresponding JSON schema part would be as follows:

"presentationTime": {"type": "number"} instead of as "presentationTime": {"type":"string"}

In an alternative example the presentationTime may be signaled with a data type other than the type "string". For example type "integer" may be used.

In this case with respect to FIG. 24 the corresponding JSON schema part would be as follows:

"presentationTime": {"type": "integer"} instead of as ""presentationTime": {"type": "string"}

In this case the semantics of SourceID and ATSC-SourceID may be as follows:

SourceID—An element describing a distribution source to which the watermarked content is attributed.

ATSCSourceID—An element describing a distribution source that employs ATSC emission specifications. This element is applicable to circumstances where the watermarked content is included in the redistribution of a service that is broadcast in accordance with ATSC emission specifications.

In this case the part of JSON schema corresponding to this may be as shown below.

```
"SourceID": {"type": "object",
    "properties": {
    "oneOf": [{
    "ATSCSourceID": {"type": "object",
    "properties": {
       "country": {"type": "string","pattern": "^[a-zA-Z]{2}$"},
       "bsid": {"type": "integer","minimum": 0, "maximum": 65535 },
       "majorChannelNo":{"type": "integer","minimum": 1,
       "maximum": 999 },
       "minorChannelNo":{"type": "integer","minimum": 1,
       "maximum": 999 }
       }
    },
    "required": ["country","bsid","majorChannelNo","minorChannelNo"]
}]}},
```

Alternative example logical structure for component anchor is shown in FIG. 24B. The main difference between FIG. 24B and FIG. 24A is that instead of defining a single presentationTime element or key or property to represent presentation time, two elements or keys or properties presentationTime and presentationTimeMsec are defined.

With respect to FIG. 24B semantics of various elements are as described below.

ComponentAnchor—An element that specifies characteristics of the first payload in a video or audio watermark segment.

intervalCodeAnchor—The intervalCode in the first payload in a video or audio watermark segment.

PresentationTimeInteger—The integer part—first 32 bits of 64-bit Network Time Protocol (NTP) formatted wall clock presentation time of the first frame of the first message block in the video watermark segment, or, for audio components, the wall clock presentation time of the first sample of the first symbol in the first cell of the audio watermark segment.

PresentationTimeFraction—The fraction part—last 32 bits of 64-bit NTP formatted wall clock presentation time of the first frame of the first message block in the video watermark segment, or, for audio components, the wall clock presentation time of the first sample of the first symbol in the first cell of the audio watermark segment. In this 32-bit fraction part non-significant low-order bits may be set to 0.

JSON schema for recovery file format with logical structure shown in FIG. 22, FIG. 23, FIG. 24B is shown as FIG. 26A-D.

Alternative example logical structure for component anchor is shown in FIG. 24C. The main difference between FIG. 24C and FIG. 24A is that instead of defining a single presentationTime element or key or property to represent presentation time, two elements or keys or properties presentationTime and presentationTimeMsec are defined.

With respect to FIG. 24C semantics of various elements are as described below.

ComponentAnchor—An element that specifies characteristics of the first payload in a video or audio watermark segment.

intervalCodeAnchor—The intervalCode in the first payload in a video or audio watermark segment.

PresentationTime—This 32-bit unsigned integer may indicate the presentation time of the first frame of the first Message block in the video watermark segment, or, for audio components, as the least-significant 32 bits of the count of the number of seconds since Jan. 1, 1970 00:00:00, International Atomic Time (TAI).

PresentationTimeMsec—This 10-bit unsigned integer in the range 0 to 999 may indicate the milliseconds offset from the time indicated in PresentationTime, such that the formula PresentationTime+(PresentationTimeMsec/1000) yields the actual presentation time of the first frame of the first Message block in the video watermark segment, or, for audio components to the nearest 1 millisecond. (PresentationTimeMsec/1000) mean PresentationTimeMsec divided by 1000.

JSON schema for recovery file format with logical structure shown in FIG. 22, FIG. 23, FIG. 24C is shown as FIG. 27A-D.

An alternative logical structure of recovery file format table is shown in FIG. 28. The logical structure of component description is shown in FIG. 29. The logical structures of component anchor is shown in FIG. 30. FIG. 31 illustrates exemplary slsProtocol values for recovery file format in FIG. 28. FIG. 32 illustrates exemplary urlType values for recovery file format in FIG. 28.

With respect to FIG. 28 semantics of various elements are as described below.

thisComponent—A description of the media component embedded with a watermark containing the VP1 payload containing serverCode and intervalCode. VP1 payload is specific arrangement of the 50-bit audio watermark payload data.

serverCode—When present, this element may provide the serverCode value employed in the HTTP request to which this recovery file was provided as a response.

intervalCode—When present, this element may provide the intervalCode value from the query request to which the recovery data table was provided as a response.

componentDescription—A data element describing this-Component in the format defined in FIG. 29 and the parameter descriptions that follow.

querySpread—When present, this element may express the maximum duration that the receiver is recommended to delay submission of a dynamic event HTTP request, in units of 1 millisecond. The expectation is that the receiver will apply a small enough level of granularity to achieve an even spread of queries across the querySpread duration, such as 1 millisecond.

otherComponent—An element describing another watermarked media component associated with the same service as thisComponent in the format defined in FIG. 25A-D and the parameter descriptions that follow.

contentID—This field may identify a content identifier.

contentID.type—Type of Content ID system used for this Content ID. Three Values are defined currently by ATSC:
"EIDR" indicates a content identification per the EIDR registry as defined in (http://eidr.org).
"Ad-ID" indicates a content identifier per the Ad-ID registry as defined in (http://ad-id.org).
"UserPriv" indicates a user private content identifier
Additional Content ID system types may be defined by ATSC in the future.

For "UserPriv" content identifier, care should be taken that the contentID.cid is unique among Content ID system types that appear in this broadcast stream.

An alternative semantics for contentID.type may be as follows:
Type of Content ID system used for this Content ID. Two values may be, for example, defined by ATSC:
"EIDR" indicates a content identification per the EIDR registry (http://eidr.org).
"Ad-ID" indicates a content identifier per the Ad-ID registry (http://ad-id.org).

Additional types for user private content identifiers can be defined. These may use a prefix of "x-" to indicate a user private content identifier type.

Additional Content ID system types may be defined by ATSC.

For user private content identifier types, the contentID.type for such systems preferably does not duplicate any Content ID system type defined by ATSC and is unique among Content ID system types that appear in the broadcast stream.

It should be noted that Instead of requiring usage of "x-" as prefix for user private content identifiers, any other specified prefix may be used. For example prefix of "UserPriv-" may be specified to be used.

Also instead of the "user private content identifiers" the term "private use content identifiers" may be used.

contentID.cid—A field that is required when contentID element is included that provides the content identification. In the case of the EIDR Content ID system, this may be the 34-character canonical form (with hyphens) of the identifier. In the case of the Ad-ID Content ID system, this may be the 11-character or 12-character canonical form of the identifier. In the case of a UserPriv Content ID system (e.g. House Numbers, ISCI, etc.), the format of the identifier is determined by the specification of the system.

House Number may include broadcaster specific private content identifiers. For example Broadcasting Company A may use their private content identifiers as their private House Numbers and Broadcasting Company B may use their private content identifiers as their private House Numbers.

Industry Standard Coding Identification (ISCI) was a standard created to identify commercials that aired on TV in the United States, for ad agencies and advertisers from 1970 until 2004. It was replaced by Ad-ID in 2005.

An alternative semantics for contentID.value may be as follows:

contentID.cid—A field that is used when contentID element is included that provides the content identification. In the case of the EIDR Content ID system, this may be the 34-character canonical form (with hyphens) of the identifier. In the case of the Ad-ID Content ID system, this may be the 11-character or 12-character canonical form of the identifier. In the case of a user defined Content ID type (with prefix "x-" for contentID.type) or any other ATSC private Content ID system (e.g. House Numbers), the format of the identifier may be determined by the specification of the system.

contentID.validFrom—Start time of the interval of validity of the contentID value.

contentID.validUntil—End time of the interval of validity of the contentID value.

sourceID—An element describing an attributable distribution source that employs ATSC emission specifications. This element is applicable to circumstances where the watermarked content is included in the redistribution of a service that is broadcast in accordance with ATSC specifications.

country—Country code associated with the primary administrative entity under which the value provided in bsid field below is assigned, using the applicable alpha-2 country code format as defined in ISO 3166-1. ISO 3166-1 is defined in ISO: ISO 3166-1:2013 (E/F), "Codes for the representation of names of countries and their subdivisions—Part 1: Country codes," International Organization for Standardization, 3rd Edition, Nov. 13, 2013, and incorporated by reference here in its entirety.

bsid—The BSID of the attributable ATSC distribution source.

majorChannelNo—The major channel number assigned to the attributable ATSC distribution source. This value is scoped to the BSID.

minorChannelNo—The minor channel number assigned to the attributable ATSC distribution source. This value is scoped to the BSID.

service—This element describes the service, its signaling formats and broadband locations.

serviceId—16-bit integer that may uniquely identify this Service within the scope of this Broadcast area.

sltSvcSeqNum—This integer number may indicate the sequence number of the Service List Table (SLT) service information with service ID equal to the serviceId attribute above. sltSvcSeqNum value may start at 0 for each service and may be incremented by 1 every time any attribute or child of this service element is changed. If no attribute or child element values are changed compared to the previous service element with a particular value of serviceID then sltSvcSeqNum may not be incremented. The sltSvcSeqNum field may wrap back to 0 after reaching the maximum value.

SLT is a table of signaling information which is used to build a basic service listing and provide discovery for signaling which provides information for acquisition of ATSC 3.0 services and their content components.

slsProtocol—Specifies the signaling format associated with this service, with permitted values and their meanings as shown in FIG. 31.

slsMajorProtcolVersion—Major version number for the signaling protocol specified in slsProtocol.

slsMinorProtocolVersion—Minor version number for the signaling protocol specified in slsProtocol.

svcInetUrl—Base URL to access Electronic Service Guide (ESG) or service level signaling files for this service via broadband, if available.

urlType—Type of files available with svcInetUrl, with permitted values and their meaning as shown in FIG. 32.

urlValue—URL to access Internet signaling files for this service identified by service identifier serviceId.

An exemplary JSON schema for recovery file format with logical structure shown in FIG. 28, is shown as FIG. 33A-E.

Another exemplary JSON schema for recovery file format with logical structure shown in FIG. 28, is shown as FIG. 34A-D.

Another exemplary JSON schema for recovery file format with logical structure shown in FIG. 28, is shown as FIG. 35A-E.

The schema in FIG. 35A-E allow any "string" data type value to be used for "type" field in one of the cases. This allows defining additional ATSC defined content ID types and user private content ID types.

In yet another example the requirement about using prefix of "x-" for user private content identifier may be enforced in the schema by defining a data type as follows:

```
"cid": {
    "type": "string",
    "pattern": "^x-",
},
```

A difference between JSON schema in FIG. 33A-E and FIG. 34A-D relates to a difference in semantics for contentID.type and contentID.cid properties. For schema in FIG. 34A-D the semantics for the properties contentID.type and contentID.cid may be as follows:

contentID.type—Type of Content ID system used for this Content ID. Following values are defined currently by ATSC:

"EIDR" indicates a content identification per the EIDR registry as defined in (http://eidr.org).

"Ad-ID" indicates a content identifier per the Ad-ID registry as defined in (http://ad-id.org).

Additional Content ID system types may be defined by ATSC in the future.

A suitable abbreviation for user defined Content ID system types be used (or may appear here). When this is done, care should be taken that the abbreviation is unique among Content ID system types that appear in this broadcast stream.

contentID.cid—Content ID value. In the case of the EIDR Content ID system, this may be the 34-character canonical form of the identifier. In the case of the Ad-ID Content ID system, this may be the 11-character or 12-character form of the IDENTIFIER. In the case of a user private Content ID system (e.g. House Numbers, ISCI, etc.), the format of the identifier is determined by the specification of the system.

The JSON schemas in FIG. 33A-E and FIG. 34A-D include the following as part of schema for the object contentID:

```
"contentID": {
    "type": "array",
    "items": {
        "type": "object",
        "properties": {"oneOf": [
            {
```

```
        ...
    },
    {
        ...
    },
        {"type": "object"}
    ]}
    },
    "minItems": 0
},
``` where " . . . " indicates different JSON schema parts as shown in FIG. 33A-E and FIG. 34A-D which are omitted here.

In this case including {"type":"object"} as part of the schema provides future extensibility. Including {"type": "object"} as part of schema for contentID object allows in addition to specifically defined constrained schema syntax for contentID which must obey the schema properties of EIDR or AD-ID or "userPriv", a free form JSON object for contentID object. The syntax of this object can be defined in future. Thus this supports future extensibility. Current version of receivers can skip past a generic JSON object in this case. Also in another example of usage, schema in FIG. 34A-D including {"type":"object"} inside contentID object can serve as another way of including any different private content id values.

FIG. 36A-B illustrate an exemplary recovery file format logical structure. One difference between FIG. 28 and FIG. 36 A-B is that a compact Ad-ID form is supported. In this form Ad-ID may be represented as the ASCII characters representing the decimal value of the 4-byte unsigned integer compact Ad-ID Identifier.

Another exemplary JSON schema for recovery file format with logical structure shown in FIG. 36A-B, is shown as FIG. 37A-E.

The schema in FIG. 37A-E allows an additional pattern entry for Ad-ID type of content identifier, which allows Ad-ID to be represented as the ASCII characters representing the decimal value of the 4-byte unsigned integer Compact Ad-ID. In an example, this is accomplished by defining a pattern that is created by performing a logical OR operation on each individual pattern. In one example this part of the schema may be as shown below.

```
"cid": {
    "type": "string",
    "pattern": "^[1-9a-zA-Z]{1}[0-9a-zA-Z]{10}(H|D)?|^[0-9]{1,10}$",
    "maxLength": 12
},
```

In the examples with respect to FIG. 17, FIG. 18, FIG. 19, FIG. 20, FIG. 21, FIG. 25A-D, FIG. 26A-D, FIG. 27A-D, FIG. 28, FIG. 29, FIG. 30, FIG. 31, FIG. 32 further extensibility the JSON schema may be defined with additionalProperties: true In other examples that prevent changing the schema with respect to FIG. 17, FIG. 18, FIG. 19, FIG. 20, FIG. 21, FIG. 25A-D, FIG. 26A-D, FIG. 27A-D, FIG. 28, FIG. 29, FIG. 30, FIG. 31, FIG. 32 further extensibility the JSON schema may be defined with additionalProperties: false.

With respect to various JSON schema, in an alternative example data type of some of the element or key or property may be different than those indicated in the schema. For example instead of data type "string" a data type "integer" or "number" or "boolean" or "array" or "object" may be used. Similarly any other JSON date type may instead be signaled as any other JSON data type. All these variations are anticipated in combination with the examples in the detailed description.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array signal (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It is to be understood that the claims are not limited to the precise configuration and components illustrated above. Various modifications, changes and variations may be made in the arrangement, operation and details of the systems, methods, and apparatus described herein without departing from the scope of the claims.

<Reference to the Related Application>

This Non-provisional application claims priority under 35 U.S.C. § 119 on Patent Application Ser. No. 62/263,520 filed on Dec. 4, 2015, Ser. No. 62/302,151 filed on Mar. 1, 2016, Ser. No. 62/310,636 filed on Mar. 18, 2016, and Ser. No. 62/373,696 filed on Aug. 11, 2016, the entire contents of which are hereby incorporated by reference.

The invention claimed is:

1. A method of receiving a recovery file format, the method comprising:
   (a) receiving a recovery data table including at least a RecoveryDataTable element;
   (b) receiving a thisComponent field of the RecoveryDataTable element describing a media component embedded with a watermark containing a VP1 payload containing serverCode and intervalCode, wherein the VP1 payload is a specific arrangement of a 50-bit VP1 payload;
   (c) receiving a queryspread element of the thisComponent field describing a maximum duration that a receiver is recommended to delay submission of a dynamic event HTTP request, in units of 1 millisecond, having a cardinality of 0 . . . 1,
   (d) receiving an otherComponent element describing another watermarked media component having a cardinality of 0 . . . N,
   (e) receiving a contentID field of the thisComponent field describing a content identifier having a cardinality of 0 . . . N;
   (f) receiving a type field of the contentID field describing a content ID type;
   (g) receiving a sourceID element of the thisComponent field, describing an attributable distribution source that employs ATSC emission specifications, having a cardinality of 0 . . . 1, wherein the sourceID element is applicable to circumstances where a watermarked content is included in a redistribution of a service that is broadcast in accordance with ATSC specifications;

(h) receiving a country field of the sourceID element describing a country code associated with a primary administrative entity;

(i) receiving a majorChannelNo field of the sourceID element describing a major channel number assigned to an ATSC distribution source;

(j) receiving a minorChannelNo field of the sourceID element describing a minor channel number assigned to the ATSC distribution source;

(k) receiving a svcInetUrl field of the sourceID element in a case that the svcInetUrl field is present;

(l) receiving a URLValue field of the svcInetUrl field describing URL to access Internet signaling files signaling files for the service, and (m) decoding at least one element of the recovery data table.

* * * * *